United States Patent
Sato et al.

(10) Patent No.: US 9,685,143 B2
(45) Date of Patent: Jun. 20, 2017

(54) DISPLAY CONTROL DEVICE, DISPLAY CONTROL METHOD, AND COMPUTER-READABLE STORAGE MEDIUM FOR CHANGING A REPRESENTATION OF CONTENT DISPLAYED ON A DISPLAY SCREEN

(71) Applicant: CANON KABUSHIKI KAISHA, Tokyo (JP)

(72) Inventors: Haruko Sato, Chofu (JP); Shinya Takeichi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 14/200,763

(22) Filed: Mar. 7, 2014

(65) Prior Publication Data
US 2014/0285507 A1  Sep. 25, 2014

(30) Foreign Application Priority Data
Mar. 19, 2013  (JP) ................................. 2013-057171

(51) Int. Cl.
*G09G 5/37* (2006.01)
*G06F 3/00* (2006.01)
(Continued)

(52) U.S. Cl.
CPC .......... *G09G 5/37* (2013.01); *G06F 3/04845* (2013.01); *G06T 3/0093* (2013.01); *G09G 5/00* (2013.01);
(Continued)

(58) Field of Classification Search
None
See application file for complete search history.

(56) References Cited

U.S. PATENT DOCUMENTS 6,084,598 A * 7/2000 Chekerylla ................... 345/441
7,075,513 B2 * 7/2006 Silfverberg ........... G06F 1/1626
345/157

(Continued)

FOREIGN PATENT DOCUMENTS

JP   2007-236469 A   9/2007
JP   2011-023004 A   2/2011
(Continued)

OTHER PUBLICATIONS

Japanese Office Action issued in corresponding application No. 2013-057171 dated Jan. 10, 2017.

*Primary Examiner* — Barry Drennan
*Assistant Examiner* — Jason Pringle-Parker
(74) *Attorney, Agent, or Firm* — Carter, DeLuca, Farrell & Schmidt, LLP

(57) ABSTRACT

A display control device for displaying content, the representation form of which is changeable by a user's operation on a display screen, on a display screen is provided. The display control device includes an operation acquisition unit configured to acquire a change instruction to change the representation form of the content and an image changing unit configured to distort the representation form of the content, in response to a change instruction which instructs to change the representation form of the content beyond a threshold value, to be different from the representation form as instructed. Thus, the display control device facilitates the user to recognize the threshold for change when the representation form of the content is changed by zooming in, zooming out, scrolling the content and the like.

15 Claims, 17 Drawing Sheets

(51) Int. Cl.
  *G06T 3/00* (2006.01)
  *G06F 3/0484* (2013.01)
  *G09G 5/00* (2006.01)
  *G09G 5/34* (2006.01)

(52) U.S. Cl.
  CPC ......... *G09G 5/34* (2013.01); *G09G 2340/045* (2013.01); *G09G 2340/14* (2013.01)

(56) References Cited

U.S. PATENT DOCUMENTS

| | | | |
|---|---|---|---|
| 7,312,805 B1* | 12/2007 | Worthington | 345/647 |
| 7,385,612 B1* | 6/2008 | Peterson | 345/619 |
| 8,149,249 B1* | 4/2012 | Oplinger | G09G 5/00 345/661 |
| 8,863,039 B2* | 10/2014 | Lim | G06F 3/0485 715/788 |
| 2003/0098872 A1* | 5/2003 | Georgiev | 345/647 |
| 2004/0056871 A1* | 3/2004 | Milliron | 345/647 |
| 2004/0249303 A1* | 12/2004 | Serra | G06F 3/0481 600/545 |
| 2010/0214300 A1* | 8/2010 | Alsbury | G06T 11/206 345/440.2 |
| 2011/0200259 A1* | 8/2011 | Lindskog | G06T 11/00 382/201 |
| 2011/0202834 A1* | 8/2011 | Mandryk | G06F 3/04883 715/701 |
| 2012/0026194 A1 | 2/2012 | Wagner et al. | |
| 2012/0066644 A1 | 3/2012 | Mizutani et al. | |
| 2014/0002502 A1* | 1/2014 | Han | G06T 11/60 345/646 |
| 2015/0022432 A1* | 1/2015 | Stewart et al. | 345/156 |

FOREIGN PATENT DOCUMENTS

| | | |
|---|---|---|
| JP | 2013-508812 A | 3/2013 |
| JP | 5160604 B | 3/2013 |

* cited by examiner $$c\,v\,e^{-d}$$

FIG. 4C $$\alpha = c\,\theta\,e^{-d}$$

FIG. 4D $$\begin{pmatrix} x' \\ y' \end{pmatrix} = \begin{pmatrix} \cos\alpha & -\sin\alpha \\ \sin\alpha & \cos\alpha \end{pmatrix} \begin{pmatrix} x \\ y \end{pmatrix}$$

FIG. 4E $$c'\,|v|\,\exp(-d^2)$$

FIG. 4F $$(x + c\,v_x\,e^{-d},\ y + c\,v_y\,e^{-d},\ c'\,|v|\,\exp(-d^2))$$

DISPLAY CONTROL DEVICE, DISPLAY CONTROL METHOD, AND COMPUTER-READABLE STORAGE MEDIUM FOR CHANGING A REPRESENTATION OF CONTENT DISPLAYED ON A DISPLAY SCREEN

BACKGROUND OF THE INVENTION

Field of the Invention

The present invention relates to a technology for changing a representation form of a content displayed on a display.

Description of the Related Art

Information processing apparatus with multi-touchscreen display, such as tablet PCs (Personal Computer) and smart phones are gaining popularity. Such information processing apparatus is capable of changing the representation form of the content displayed on the touchscreen through gestures with one or more fingers. The representation form of the content is changed by, for example, scrolling (translating), zooming in, zooming out, rotating and the like. For example, when a finger touching the touchscreen is linearly moved in one direction, the content is accordingly scrolled to the direction. Further, when a distance between two fingers is decreased, the content is zoomed out for display. When a distance between two fingers is increased, the content is zoomed in for display.

Changing the content sometimes causes the content to go beyond a display area of the touchscreen. Also, changing the content sometimes causes the content to become reduced in size and the edge thereof is displayed on the touchscreen. Japanese Patent Application Laid-Open No. 2011-023004 discloses that, in a case where it is necessary to display an area beyond the edge of the content, margins are displayed in an area beyond the edge of the content. After the margins are displayed and the change of the content is completed, the content returns to a size within the range of the display area.

A predefined scaling factor is set for zoom-in ratio (or zoom-out ratio) to zoom in or zoom out the content. When the content is zoomed in (or zoomed out) beyond the predefined scaling factor, the content is temporarily zoomed in (or zoomed out) with the factor beyond the predetermined scaling factor for display. However, when the operation is terminated, the content returns to the size with the pre-defined scaling factor.

In Japanese Patent Application Laid-open No. 2011-023004, the content is temporarily zoomed in (or zoomed out) for display beyond the predefined scaling factor, which corresponds to a threshold for change of the content. Due to this, it is difficult for a user to learn the threshold for change in zooming in or zooming out the content, which sometimes causes the user to keep executing the zoom-in or zoom-out operation of the content even beyond the threshold for change. Similarly, when scrolling the content, the user sometimes keeps executing a scroll operation beyond the edge of the content.

SUMMARY OF THE INVENTION

The display control device of the present invention to solve the above mentioned problems comprises a display unit configured to display a content, the representation form of which is changeable by a user's operation, on a predetermined display screen; an operation acquisition unit configured to acquire a change instruction to change the representation form of the content; and an image changing unit configured to distort the representation form of the content, in response to a change instruction which instructs to change the representation form of the content beyond a threshold value, to be different from the representation form as instructed.

Further features of the present invention will become apparent from the following description of exemplary embodiments (with reference to the attached drawings).

BRIEF DESCRIPTION OF THE DRAWINGS

FIGS. 4A, 4B, 4C, 4D, 4E, 4F, and 4G are diagrams illustrating an expression relating an intersection movement during change processing.

FIGS. 6A, 6B, 6C and 6D are explanatory diagrams of content.

FIG. 17B is a diagram exemplifying the content.

DESCRIPTION OF THE EMBODIMENTS

In the following, an embodiment of the present invention is described in detail with reference to the accompanying drawings.

(Overall Configuration)

Figure 1:
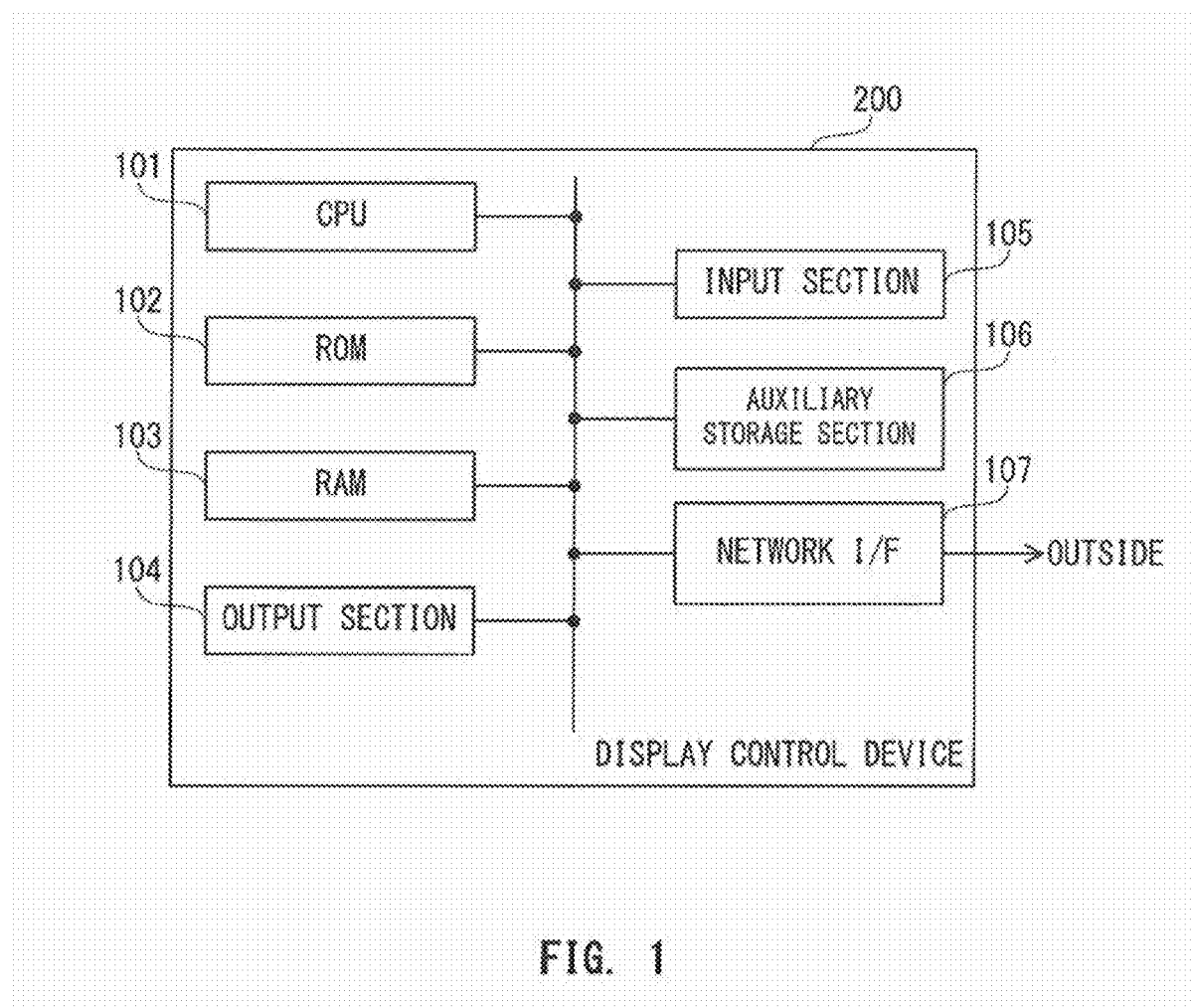
FIG. 1 is a hardware configuration diagram of a display control device.

FIG. 1 is a hardware configuration diagram of a display control device. The display control device 200 is realized by an information processing apparatus such as tablet PC, smart phone and the like.

A central processing unit (CPU) 101 is comprised of microprocessors and the like and handles overall operation control of the display control device 200. A read only memory (ROM) 102 stores a computer program and the like for controlling the operation by the display control device 200. A random access memory (RAM) 103 is a memory used as a work area when the CPU 101 executes processing, in which data being processed and the like are temporarily stored.

An output unit 104 is a display comprising a display screen, speaker and the like, which provides user with image or sound. An input unit 105 is a keyboard, a touch panel, a mouse, a button, a touchpad, a camera and the like, and capable of entering data. In this embodiment, a touchscreen, configured by combining a display and a touch panel together, is used.

An auxiliary storage unit 106 is a mass storage device, which includes a hard disk, a flash memory, a memory card and the like. A network interface (I/F) 107 communicates with other device provided outside.

Figure 2:
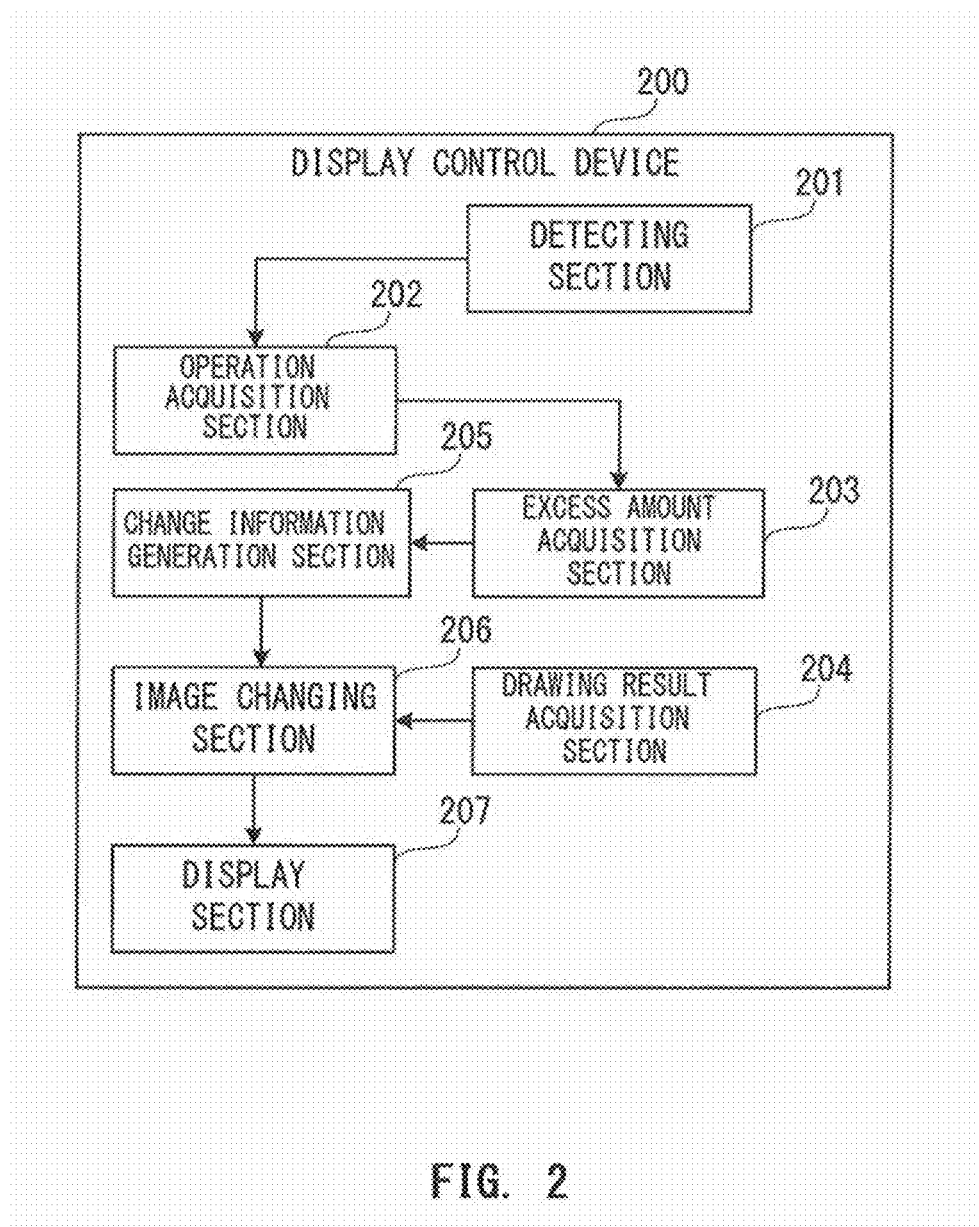
FIG. 2 is a function block diagram of the display control device.

FIG. 2 is a function block diagram formed within the display control device 200 by loading and running, by the CPU 101, a computer program from the ROM 102. The display control device 200 forms a detecting unit 201, an operation acquisition unit 202, an excess amount acquisition unit 203, a drawing result acquisition unit 204, a change information generation unit 205, an image changing unit 206 and a display unit 207. It is noted that, FIG. 2 particularly illustrates a function block for changing a representation form of the content by, for example, scrolling, zooming in or zoom out of the content. As to a function block for other processing executed in the display control device 200, it is omitted in FIG. 2. When hardware is alternatively constituted for software processing using the CPU 101, an operation part or a circuit, which corresponds to the processing of each function block as described herein, may be configured.

The content, which is an electronic content, comprises an image such as operation screen, web pages, still image, motion picture, presentation, spread sheet, electronic document, and e-mail, which can be displayed on the output unit 104. The representation form of the content can be changed by the user's operation. A threshold value, representing a threshold for change of the representation form (hereinafter referred to as "threshold value for change") is set to the content. For example, the threshold value for change is as follows. In a case where the change is made by zooming in or zooming out the content, a maximum zoom-in ratio or a maximum zoom-out ratio at which zooming in or zooming out the content is no longer allowed is the threshold value for change. In a case where the change is made by rotating the content, an angle at which rotating the content is no longer allowed is the threshold value for change. In a case where the change is made by scrolling the content, a scroll end position at which scrolling of the content is no longer allowed is the threshold value for change.

The detecting unit 201 detects movement information of a touch position, where the user touches the touchscreen, based on the information notified from the touchscreen. The information notified from the touch screen includes touch events. The touchscreen used in this embodiment notifies three types of touch events, including "DOWN", "MOVE", and "UP" touch events. The "DOWN" event shows start of touch. The "MOVE" event shows that a finger or a stylus is moved with the finger or the stylus remain touching the touchscreen. The "UP" event shows that the touch point is released from the touchscreen. In response to detecting the "MOVE" event, the detecting unit 201 detects the movement information. The movement information includes information about a movement direction of the touch position, a movement amount of the touch position, the touch position at which an operation is started and the touch position at which the operation is terminated. The "MOVE" event as herein described is the touch event which is notified from the touchscreen when the user whose finger is touching the touchscreen moves his finger with his finger remain touched the touchscreen. The movement direction of the touch position which is detected by the detecting unit 201 is the direction toward which the representation form of the content is changed (operation direction). Such movement direction includes the direction for zooming in or zooming out the content, the direction for scrolling the content and the direction for rotating the content. Further, the movement amount corresponds the amount of change of the representation form of the content, that is, an operation amount of the content. The user can specify the position on touchscreen or touchpad using an object such as a finger, a stylus, a pointer, a cursor and the like. The user can move the position as specified on the touchscreen or the touchpad by moving the object. Following describes a case, as an example, where the user uses his finger as the object to execute a touch operation. Based on the movement information detected by the detecting unit 201, the representation form of the content is changed. The detecting unit 201 detects the touch operation executed by the user based on the movement information caused by the movement of the object. It is noted that a variety of methods are available for detecting touch by the touchscreen, examples of which are resistive, capacitive, infrared, ultrasonic sound wave, acoustic wave, and vibration. Further, the detecting unit 201 may detect, for example, the touch position as defined with respect to a display using a system such as a range image sensor or a stereo camera which is capable of detecting a position in a three-dimension (3D) space and is capable of detecting whether or not a touch is made to the surface of the display. Further, in a case where the detection is made to the position with a detecting means capable of detecting the position information such as user's finger not touching the surface of the touchscreen but close thereto (hover position), the detecting unit 201 is able to equally treat such position information the same as the touch position.

The operation acquisition unit 202 acquires a change instruction to change the representation form of the content based on the movement information detected by the detecting unit 201. The change instruction is an instruction to scroll, to zoom in, to zoom out, or to rotate the content. For example, in a case where a user moves at least one of his fingers on the touchscreen while keeping his more than one fingers remain touched the touchscreen, a distance between the fingers (a distance between two touch positions) increases. When such movement information is acquired, the operation acquisition unit 202 acquires the movement information as the change instruction to zoom in the content. Since respective touch position of each of more than one fingers are moved in the direction (operation direction) so as to away from each other, the operation acquisition unit 202 recognizes the operation as a zoom-in operation of the content. The touch position at which the finger is first touched the touchscreen is defined as a start of touch. The more the distance between the fingers increases, the more the operation amount becomes large and the more the zoom-in ratio of the content increases. It is noted that, the touch operation using more than one fingers are called multi-touch operation. In particular, the operation to move fingers so as to increase or decrease the distance between the fingers to instruct to zoom in or zoom out the content is called pinch operation.

The excess amount acquisition unit 203 acquires excess amount, which is the operation amount beyond the threshold value for change. The content is changed in accordance with the operation amount as long as it does not exceed the threshold value. For example, in a case where the zoom-in operation of the content is executed, the zoom-in ratio is determined in accordance with the operation amount. In a case where the zoom-in operation is instructed beyond the operation amount corresponding to the maximum zoom-in ratio, which is defined as the threshold value for change to zoom in, the excess amount acquisition unit 203 acquires excess fraction (difference) as the excess amount. Also, in a case where the content is zoomed out, rotated and scrolled, the operation amount beyond the threshold value for change is acquired as the excess amount.

The drawing result acquisition unit 204 acquires an image at the threshold for change, which is a result of the content as drawn at the threshold value for change. For example, in a case where the zoom-in operation of the content is executed, the drawing result acquisition unit 204 acquires a result of the content as drawn at the maximum zoom-in ratio, which is defined as the threshold for change to zoom in.

The change information generation unit 205 generates change information. The change information is generated by partitioning a display area of the image at the threshold for change into mesh at equal spaces and by distorting the mesh based on the touch position moved by the user's finger movement and the excess amount of the movement amount. For example, in a case where the zoom-in operation of the content is executed, change such as distortion is made to the mesh in accordance with the finger position at which the finger terminated the zoom-in operation, the operation direction, and the excess amount acquired by the zoom-in operation. Then, the change information generation unit 205 generates the change information to change the content in a manner other than magnifying the content.

The image changing unit 206 distorts, in accordance with the change information, the image at the threshold for change to the representation form, in which different change from that as instructed was made by the user's operation, to generate a changed image. It is noted that, in a case where the operation amount does not exceed the threshold value for change, the change information will not be generated and a normal image of the content in accordance with the operation amount will be generated. If the user sees that, in spite of the fact that the zoom-in operation was given, the content was not magnified but changed into a different form, the user can intuitively recognize that the zoom-in operation of the content is no longer allowed.

The display unit 207 displays the changed image or the normal image generated in the image changing unit 206 on a display screen of the output unit 104.

Figure 3:
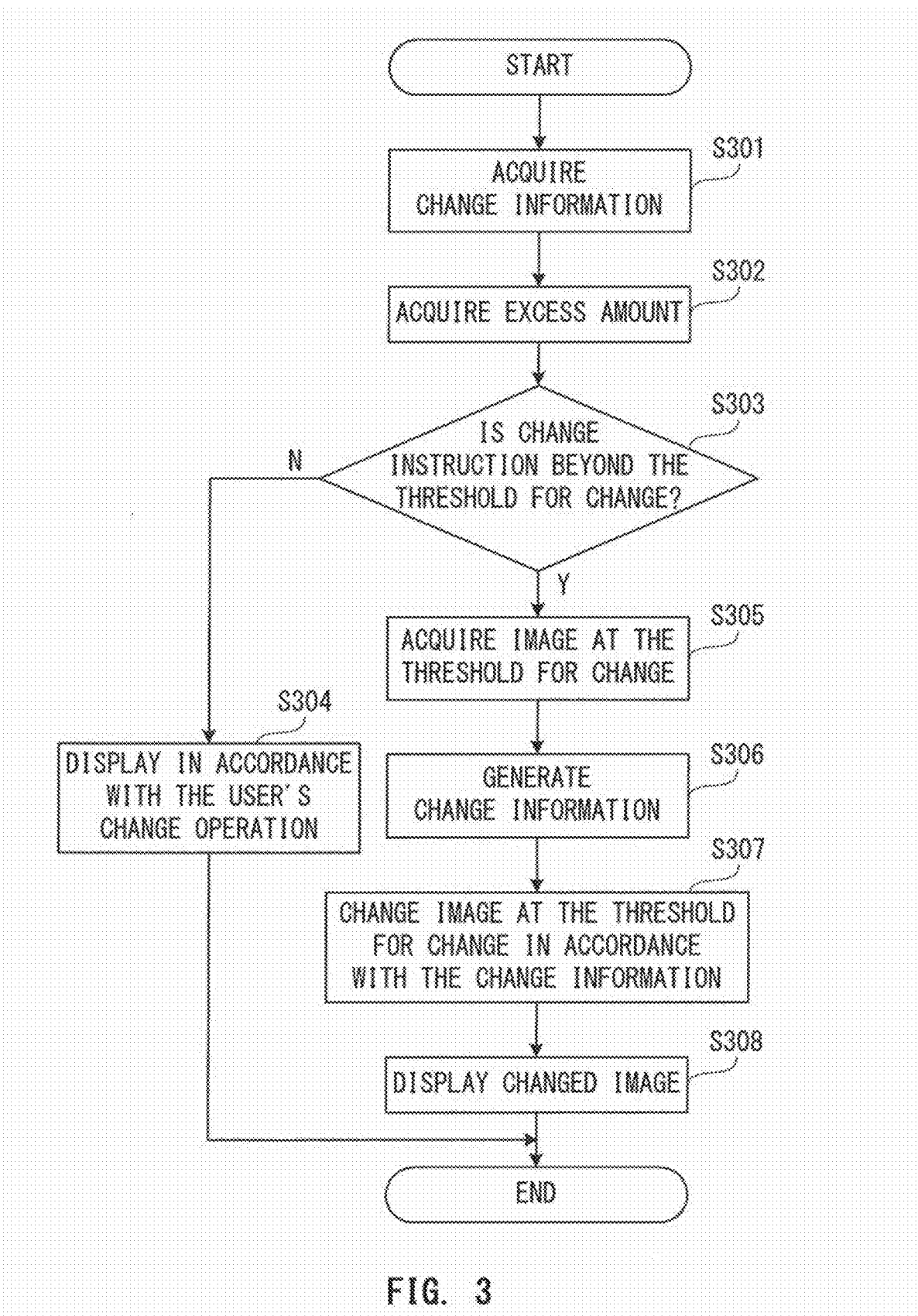
FIG. 3 is a flow chart illustrating a processing procedure when a content is operated.

FIG. 3 is a flow chart illustrating a processing procedure when the representation form of the content is changed by the display control device 200. Hereinafter, an example will be given in a case where the content is zoomed in through a gesture with two fingers, which is to increase a distance between the fingers on the touchscreen. Each processing procedure will be described as follows.

The detecting unit 201 identifies the touch position at which the user touches the touchscreen with his first finger, identifies the touch position at which the user touches touchscreen with his second finger, and detects movement information of each touch position. Further, the operation acquisition unit 202 acquires, based on the movement information detected by the detecting unit 201, the change instruction to change the representation form of the content instructed by the user. For example, upon detection of the increase of the distance between the two fingers, the operation acquisition unit 202 acquires zoom-in operation of the content (S301).

The excess amount acquisition unit 203 acquires the excess amount based on the threshold value for change of the content in accordance with the change instruction acquired by the operation acquisition unit 202 and the operation amount detected by the detecting unit 201. The zoom-in operation of the content was acquired here. Therefore, the difference between operation amount of finger at which maximum zoom-in ratio, which is defined as the threshold value for change of the content, can be gained and the operation amount detected by the detecting unit 201 will be calculated. If the operation amount of finger detected by the detecting unit 201 exceeds the threshold value for change, the difference will become an excess amount (S302).

The excess amount acquisition unit 203 then determines whether the zoom-in instruction is beyond the threshold for change (S303).

If it is determined that the operation amount is below the threshold value for change, that is, the zoom-in instruction as given is not beyond the threshold for change (S303: N), the image changing unit 206 calculates the zoom-in ratio in accordance with the operation amount, and generates the content as magnified at the zoom-in ratio. The display unit 207 accordingly displays the generated content on the touchscreen display (S304).

On the other hand, if it is determined that the operation amount is beyond the threshold value for change (S303:Y), the drawing result acquisition unit 204 acquires an image at the threshold for change, which is the content generated at the maximum zoom-in ratio, which is defined as the threshold value for change to zoom-in (S305). When the processing is first executed, the image at the threshold for change is generated. The image at the threshold for change as first generated is used for the second and the subsequent processing. The image at the threshold for change is yet to be drawn on the touchscreen.

Upon acquisition of the image at the threshold for change, the change information generation unit 205 generates the change information. The change information is generated by distorting the mesh, in which the display area of the image at the threshold for image is partitioned in a grid-like manner at equal spaces, based on the touch position at which the user terminated his finger operation, the operation direction, and the excess amount to generate the change information (S306). The change of the mesh will be described later.

The image changing unit 206 changes, in accordance with the change information, the image at the threshold for change acquired at step S305 (S307). The image changing unit 206 executes texture mapping of the image at the threshold for change in accordance with the change information to generate the changed image. The changed image is mapped on the mesh where is changed so that the changed image will be a distorted content. Further, depending on the excess amount, the degree of the content distortion can be changed.

The display unit 207 displays the generated changed image on the touchscreen display (S308). The zoom-in processing of the content ends in this manner.

Description will be made with regard to changing mesh at step S306. It is noted that, coordinate used to change mesh is a two dimensional (2D) plane coordinate or a three dimensional (3D) space coordinate as defined to entirely include the touchscreen display area.

The change information generation unit 205 acquires, from the excess amount acquisition unit 203, vector v(vx, vy), representing the excess amount of the operation amount and the operation direction associated with the movement of the touch position of the first finger. The vector v is multiplied by an appropriate coefficient (0<c≤1), which shall be a basic coordinate movement amount. The movement amount of the intersection can be expressed by, for example, an expression as shown in FIG. 4A, in which the distance "d" is defined as a distance from coordinates (x,y) of mesh intersection subject for movement to the touch position at which the first finger terminated its operation. By applying the expression to each mesh intersection to move the position at which the intersection is represented, the mesh is changed. The coordinates (x', y') of the point after the change is made to the coordinates (x, y) of the intersection can be expressed by the expression as shown in FIG. 4B.

The same processing will be executed with regard to the user's second finger. In this case, vector v represents the excess amount and the operation direction of the second finger. It is noted that, when the distance between the two fingers is changed, it is not necessarily that the both fingers are moved. Therefore, it is not necessarily the case that the excess amount for only the first finger and the second finger both is acquired. The same holds true with respect to the processing to zoom out, rotate, and the like as will be described later.

It is not necessary to move the mesh intersection located at a certain distance away from the position of the first finger and the position of the second finger at which the first finger and the second finger terminated each operation. Alternatively, in one embodiment, only the points included in an ellipse defined with a first focal point and a second focal point may be the subject for movement. In the embodiment, first focal point is the first finger position or the second finger position at which the first finger or the second finger terminated each operation, and the second focal point is the first finger position or the second finger position at which the maximum zoom-in ratio, which is defined as the threshold for change of the content, is obtained. Further, the coordinates of the mesh intersection, which correspond to the edge of the content subject for operation, will not be moved.

Figure 5A:
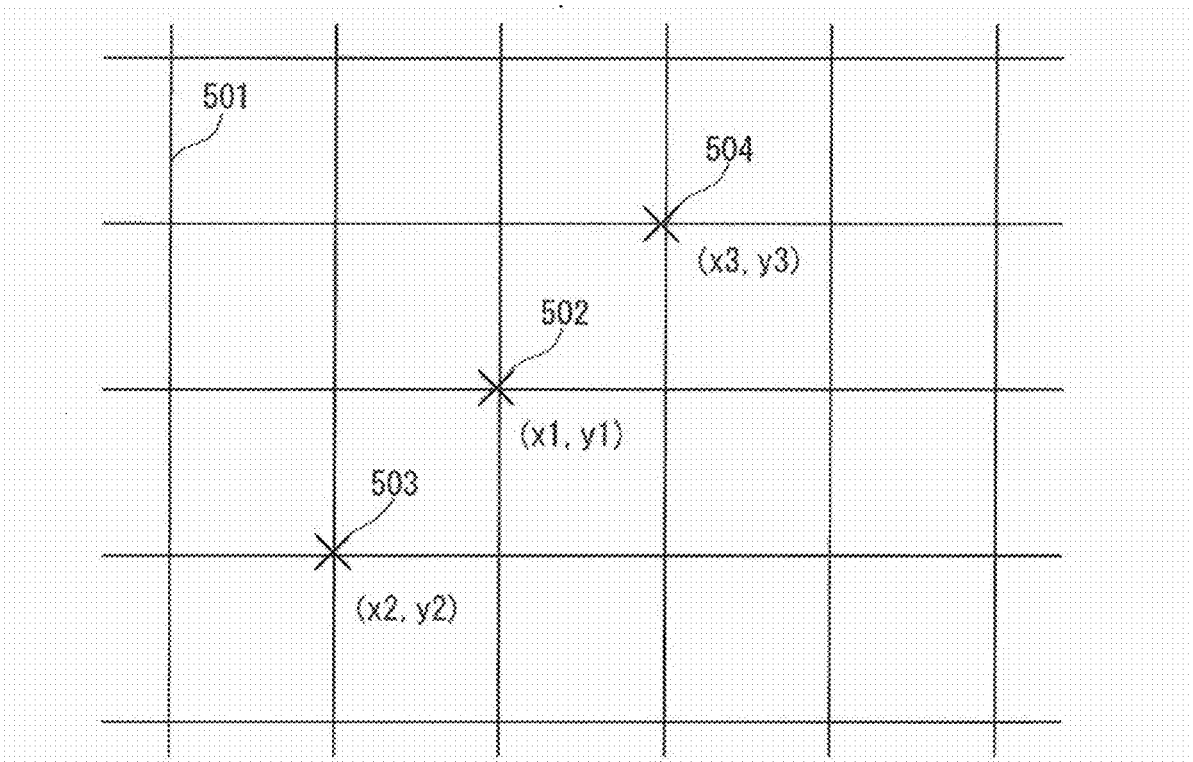
FIG. 5A is a diagram exemplifying mesh before any change is made to the mesh.

FIG. 5A is a diagram exemplifying a mesh before any change is made to the mesh. There are mesh intersections located on mesh 501, including intersections 502, 503, and 504, which are respectively located on coordinates (x1, y1), coordinates (x2, y2), and coordinates (x3, y3).

Figure 5B:
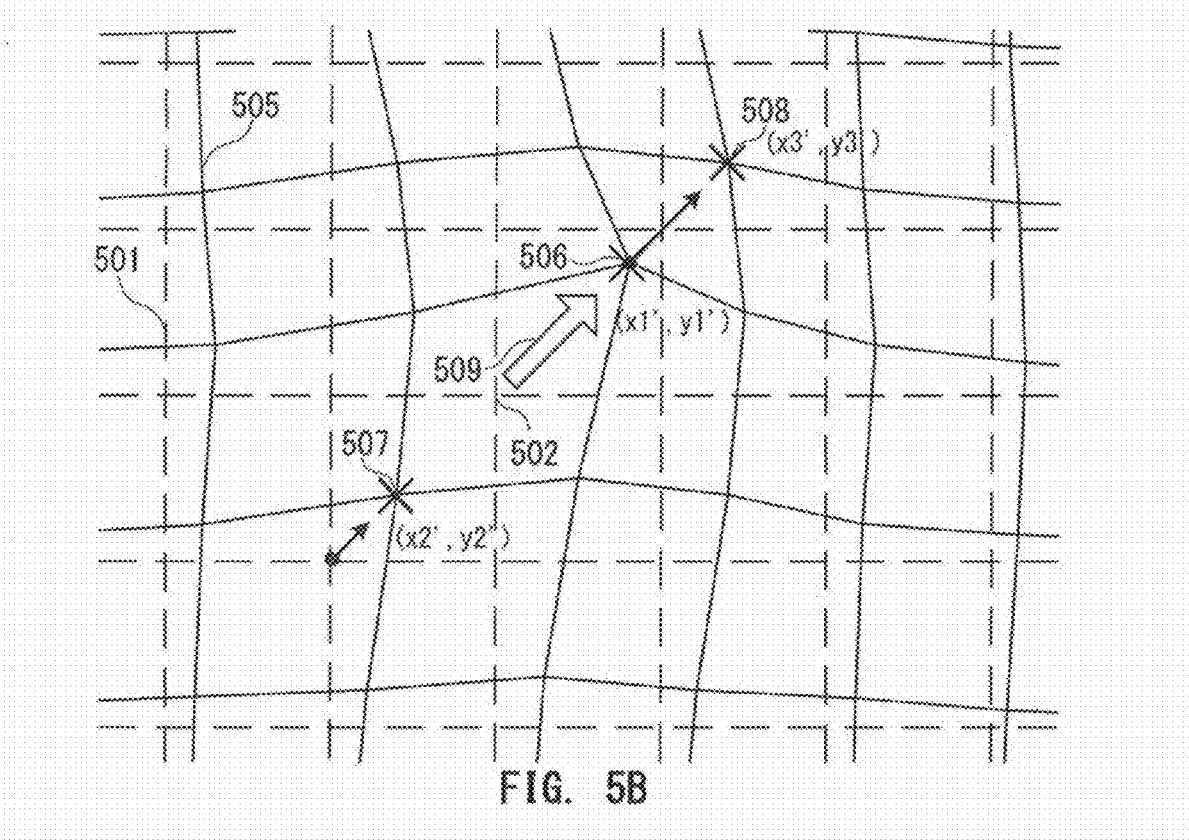
FIG. 5B is a diagram exemplifying mesh after the change is made to the mesh.

FIG. 5B is a diagram exemplifying a case where the mesh 501 as illustrated in FIG. 5A is changed. A finger tip for executing zoom-in operation is moved from the intersection 502 toward the intersection 506. The excess amount and the operation direction are represented by vector v509. The dashed line represents the mesh 501 before any change is made to the mesh. The intersections 502, 503 and 504 are respectively moved toward the intersections 506, 507 and 508. Other intersections are also moved by the movement amount in accordance with the distance from the intersection 502. Connecting the intersections as moved generates change information 505.

In this example, the movement amount of each mesh intersection varies depending on the distance from the finger position. Therefore, the less the distance from the finger position executing the zoom-in operation, the more the degree of the mesh distortion increase, and the more the distance from the finger position, the less the degree of the mesh distortion increase. Further, the degree of the mesh distortion varies depending on the excess amount. In particular, the more the excess amount, the more the degree of the mesh distortion increases, and the less the excess amount, the less the degree of the mesh distortion increases.

Figures 6A, 6B, 6C, 6D:
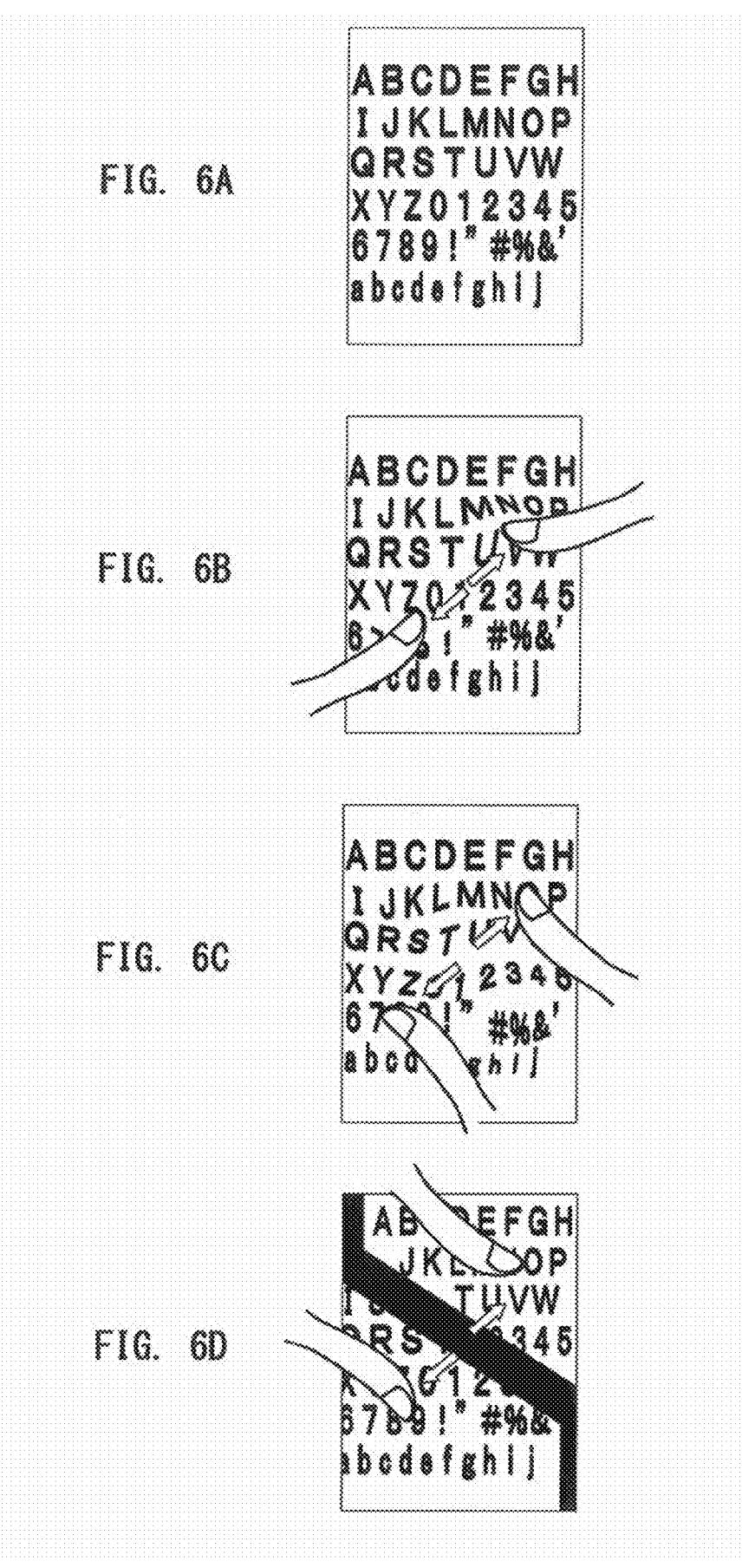

FIG. 6A is a diagram exemplifying the content at the threshold for change (threshold for magnification). FIGS. 6B to 6D are the diagrams exemplifying the content after some sort of change is made.

FIG. 6B is a drawing image of the content acquired based on the change information 505 as illustrated in FIG. 5B, in which visual effect is given to the user that, since the content as changed in accordance with the finger movement is beyond the threshold for change, the content resists to the change.

The mesh may be changed as follows.

The change information generation unit 205 acquires, from the excess amount acquisition unit 203, vector v(vx, vy), representing the excess amount and the operation direction of the first finger. The vector v is multiplied by an appropriate coefficient c (0<c≤1), which shall be a basic coordinate movement amount. A distance from a perpendicular bisector of the coordinate points of the first finger and the second finger at which the first finger and the second finger respectively terminated each operation to the coordinates (x, y) of the mesh intersection subject for movement and located in a region where the first finger is positioned is defined as a distance d. Then, the movement amount of the intersection can be expressed by the expression as shown in FIG. 4A. The expression is applied to each intersection located in a region where the first finger is positioned with respect to the perpendicular bisector to change the mesh. The coordinates (x', y') represent the points after the change is made to the coordinates (x, y) of the intersection, and it can be expressed by the expression as shown in FIG. 4B. The intersection, which corresponds to the edge of the content subject for operation, will not be moved.

The same processing will be executed with regard to the user's second finger. In this case, the vector v (vx, vy) represents the excess amount and the operation direction of the second finger.

The change can only be made in a region defined between the first finger and the second finger.

Figure 7A:
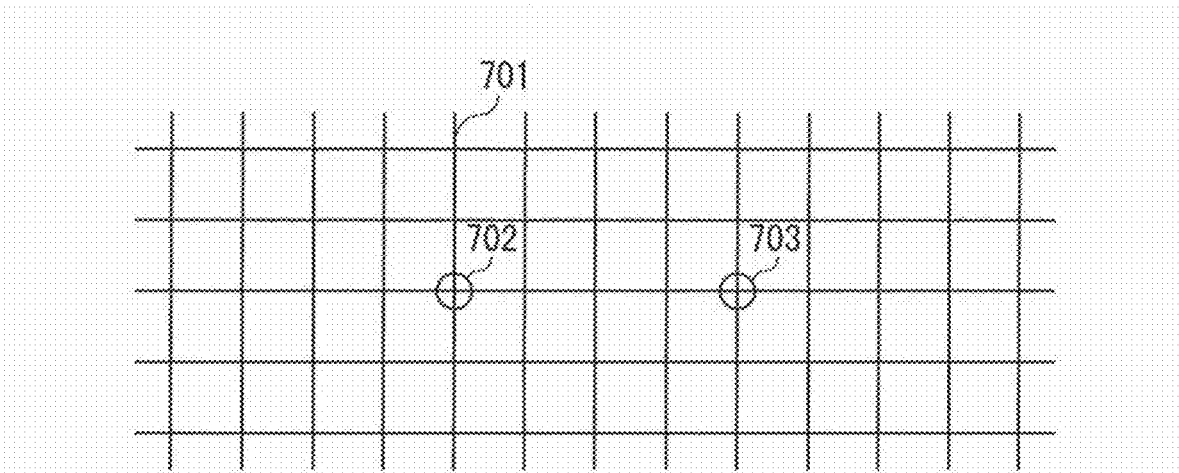
FIG. 7A is a diagram exemplifying mesh before any change is made to the mesh.

FIG. 7A is a diagram exemplifying mesh 701 before any change is made to the mesh. A first finger position 702 and a second finger position 703 are respectively located on the content.

Figure 7B:
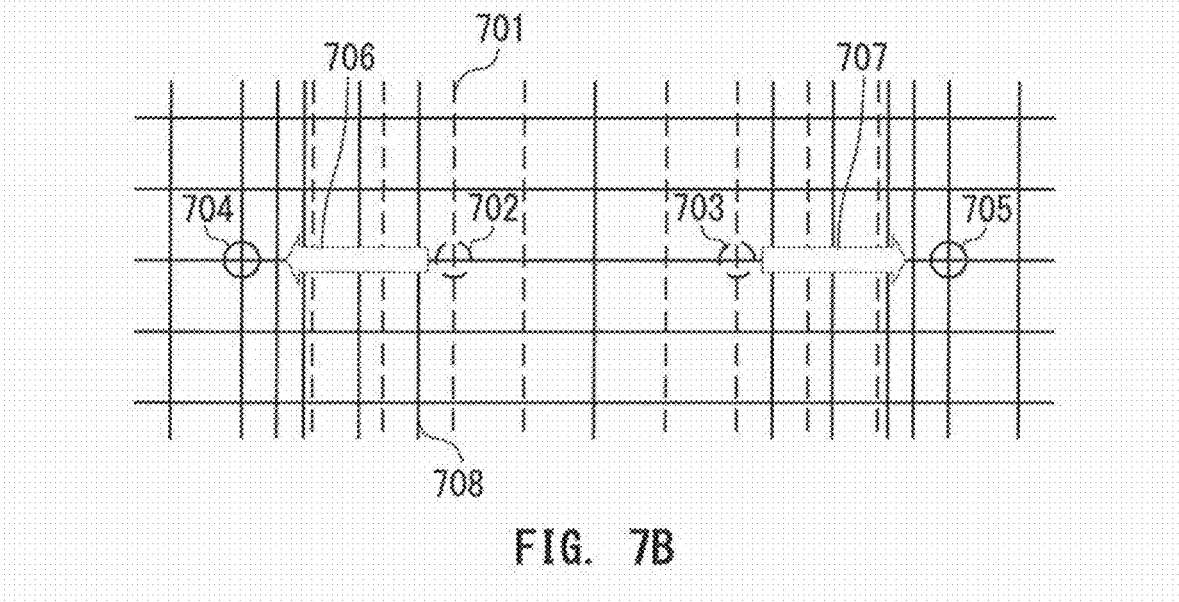
FIG. 7B is a diagram exemplifying mesh after the change is made to the mesh.

FIG. 7B is a diagram exemplifying a case where the mesh 701 as illustrated in FIG. 7A is changed. By executing zoom-in operation, the first finger position 702 is moved toward the position 704 and the second finger position 703 is moved toward the position 705. The change information generation unit 205 acquires, from the excess amount acquisition unit 203, vector v706, representing the excess amount and the operation direction of the first finger, and vector v707, representing the excess amount and the operation direction of the second finger. The dashed line represents the mesh 701 before any change is made to the mesh. Each intersection which lies between the first finger position 704 and the second finger position 705 located on the mesh 701 is moved. The movement amount gradually decreases depending on the distance from the perpendicular bisector to the first finger position 704 and the distance from the perpendicular bisector to the second finger position 705. Connecting the intersections as moved generates change information 708.

FIG. 6C is a drawing image of the content acquired based on the change information 708 as illustrated in FIG. 7B, in which visual effect is given to the user that, since the content as changed in accordance with the finger movement is beyond the threshold for change, the content is forcedly pulled.

The mesh may be changed as follows.

The mesh is divided into two units with respect to the perpendicular bisector between the first finger and the second finger. The change information generation unit 205 acquires, from the excess amount acquisition unit 203, vector v(vx, vy), representing the excess amount and the operation direction of the first finger. All the mesh located in a first section where the first finger is positioned with respect to the perpendicular bisector are translated in the direction of the first unit by the amount calculated by multiplying the vector v by an appropriate coefficient c (0<c≤1). Likewise, the mesh located in a second section where the second finger is positioned is translated in the direction of the second unit. A region where no mesh exists is filled with a simple color. Alternatively, the region is filled with an image which is different from the content (S308).

Figure 8A:
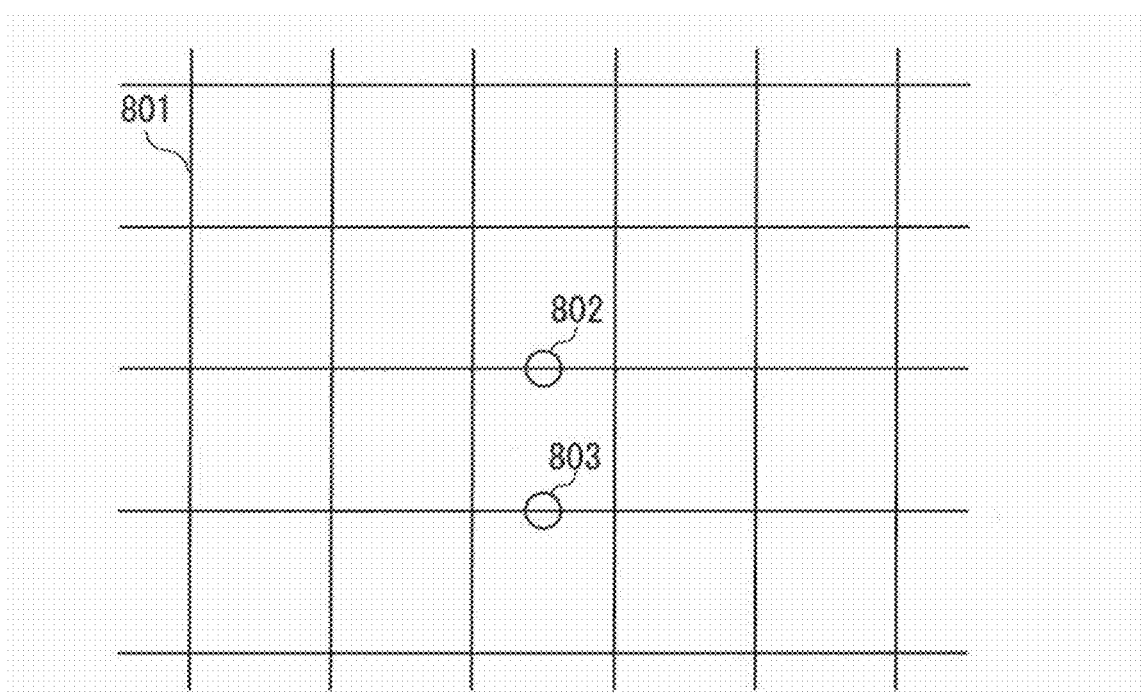
FIG. 8A is a diagram exemplifying mesh before any change is made to the mesh.

FIG. 8A is a diagram exemplifying a mesh 801 before any change is made to the mesh. A first finger position 802 and a second finger position 803 are respectively located on the content.

Figure 8B:
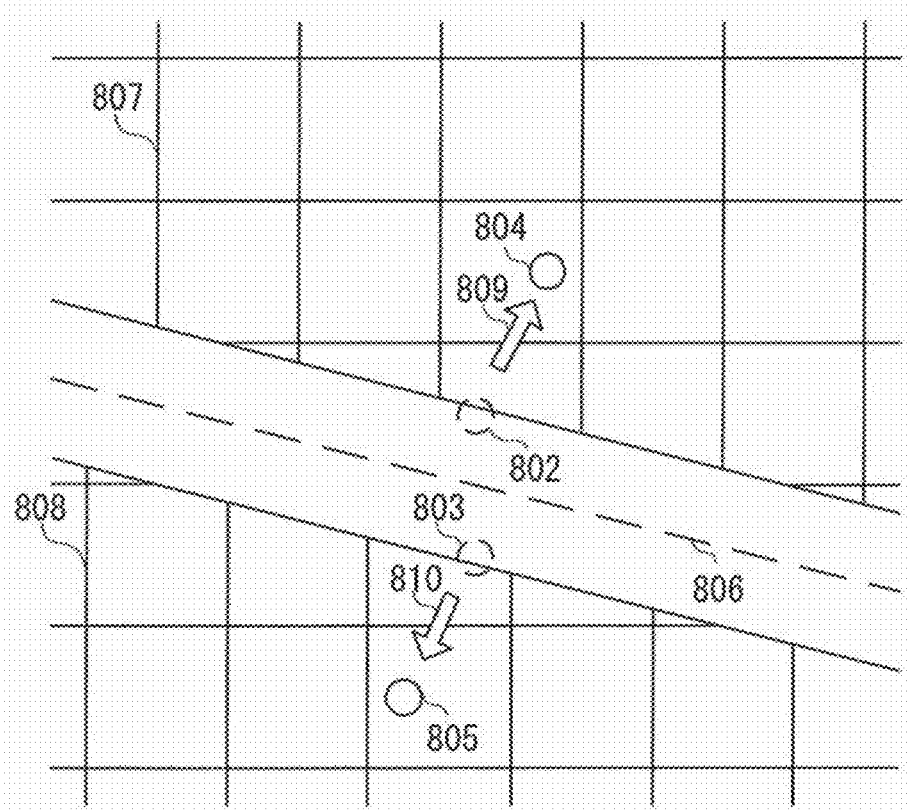
FIG. 8B is a diagram exemplifying mesh after the change is made to the mesh.

FIG. 8B is a diagram exemplifying a case where the mesh 801 as illustrated in FIG. 8A is changed. By executing the zoom-in operation, the first finger position 802 is moved toward the position 804 and the second finger position 803 is moved toward the position 805. The change information generation unit 205 acquires, from the excess amount acquisition unit 203, vector v809, representing the excess amount and the operation direction of the first finger, and vector v810, representing the excess amount and the operation direction of the second finger. The mesh 801 before any change is made is divided into two sections with respect to the perpendicular bisector 806 between the first finger position 804 as moved and the second finger position 805 as moved as the result of executing the zoom-in operation. The mesh 807 is translated in the direction of the first finger position 804. Similarly, the mesh 808 is translated in the direction of the second finger position 805.

FIG. 6D is a drawing image of the content acquired based on the change information as illustrated in FIG. 8B, in which visual effect is given to the user that, since the content as changed in accordance with the finger movement is beyond the threshold for change, the content is split.

With the display control device 200 as above, in a case where the zoom-in operation is executed beyond the threshold for change, the content is distorted, which enables the user to easily recognize the excess of the threshold for change. Further, the change in the degree of the content distortion teaches the user to what extent the threshold for change is exceeded by the zoom-in operation, which enables to visually show the excess to the user.

[Restoring Drawing Image of Changed Content]

Next, description will be made with regard to processing at the time of ending an operation after the operation beyond the threshold for change.

Figure 9:
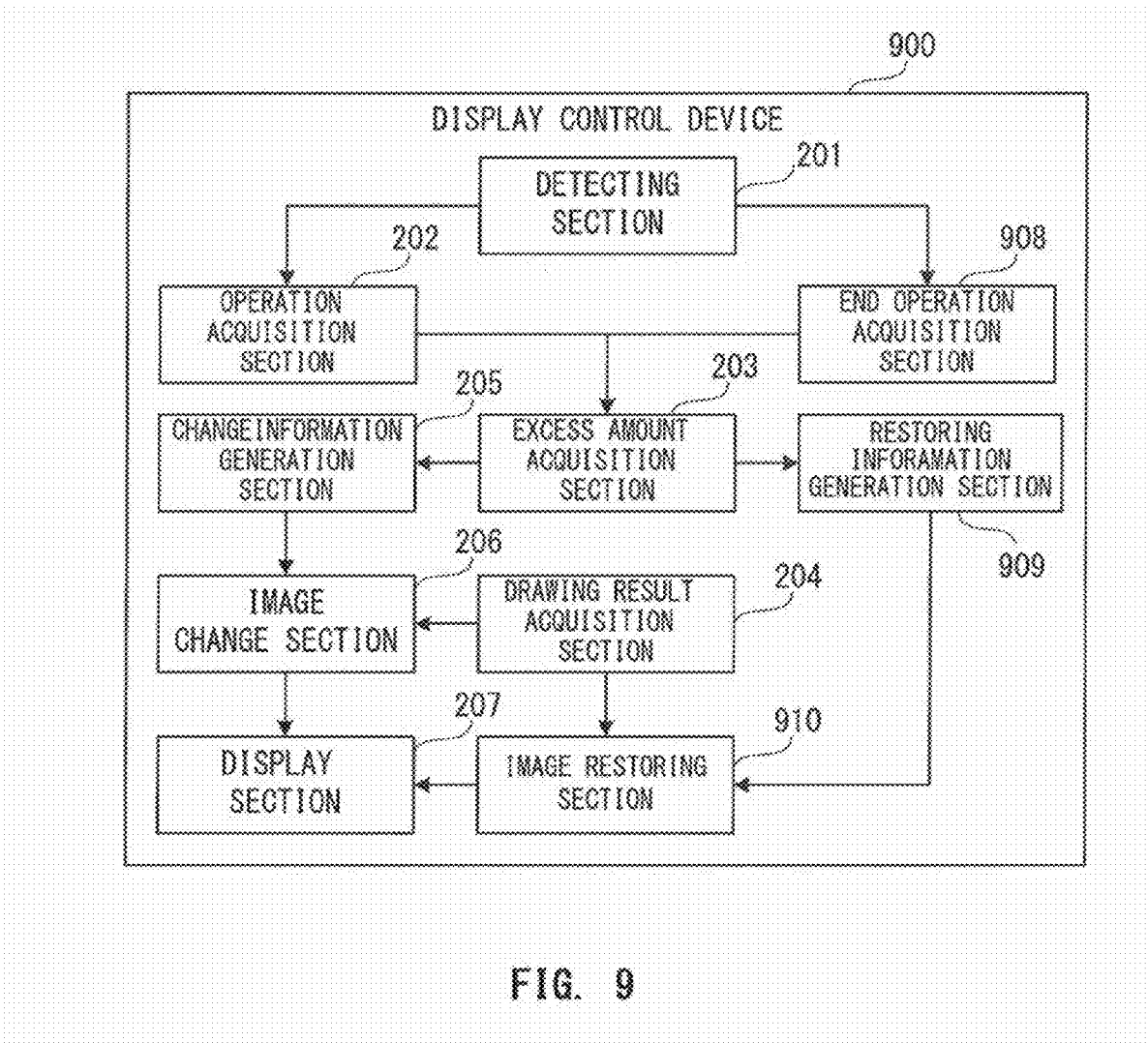
FIG. 9 is a function block diagram of the display control device.

FIG. 9 is a function block diagram of the display control device 900 at the time of ending the operation. It is noted that, the configuration of the hardware of the display control device is similar to that as illustrated in FIG. 1. Therefore, description thereof will be omitted.

The display control device 900 forms, in addition to the functional blocks included in the display control device 200, an ending operation acquisition unit 908, a restoring information generation unit 909, and an image restoring unit 910, by reading and running computer program from the ROM 102 by the CPU 101.

The ending operation acquisition unit 908 acquires an instruction to end the change of the representation form based on the movement information detected by the detecting unit 201. In this embodiment, when the detecting unit 201 detects, based on the "UP" event notified from the touchscreen, that user's finger is off the touchscreen, the ending operation acquisition unit 908 detects the end instruction to end the change.

The restoring information generation unit 909 generates restoring information for restoring the distorted mesh, which represents the change information at the time of detecting the end instruction to end the change, to the original state. For example, each intersection of the distorted mesh is moved toward the original position on the original grid-like mesh to generate the restoring information. In order to generate the restoring information, the excess amount and the operation direction at the time of generating the change information may be used.

The image restoring unit 910 generates restored image for restoring the content beyond the threshold for change based on the restoring information generated by the restoring information generation unit 909. The restored image finally comes to represent the same image as the image at the threshold for change, and then, the content image is updated to the image at the threshold for change.

Figure 10:
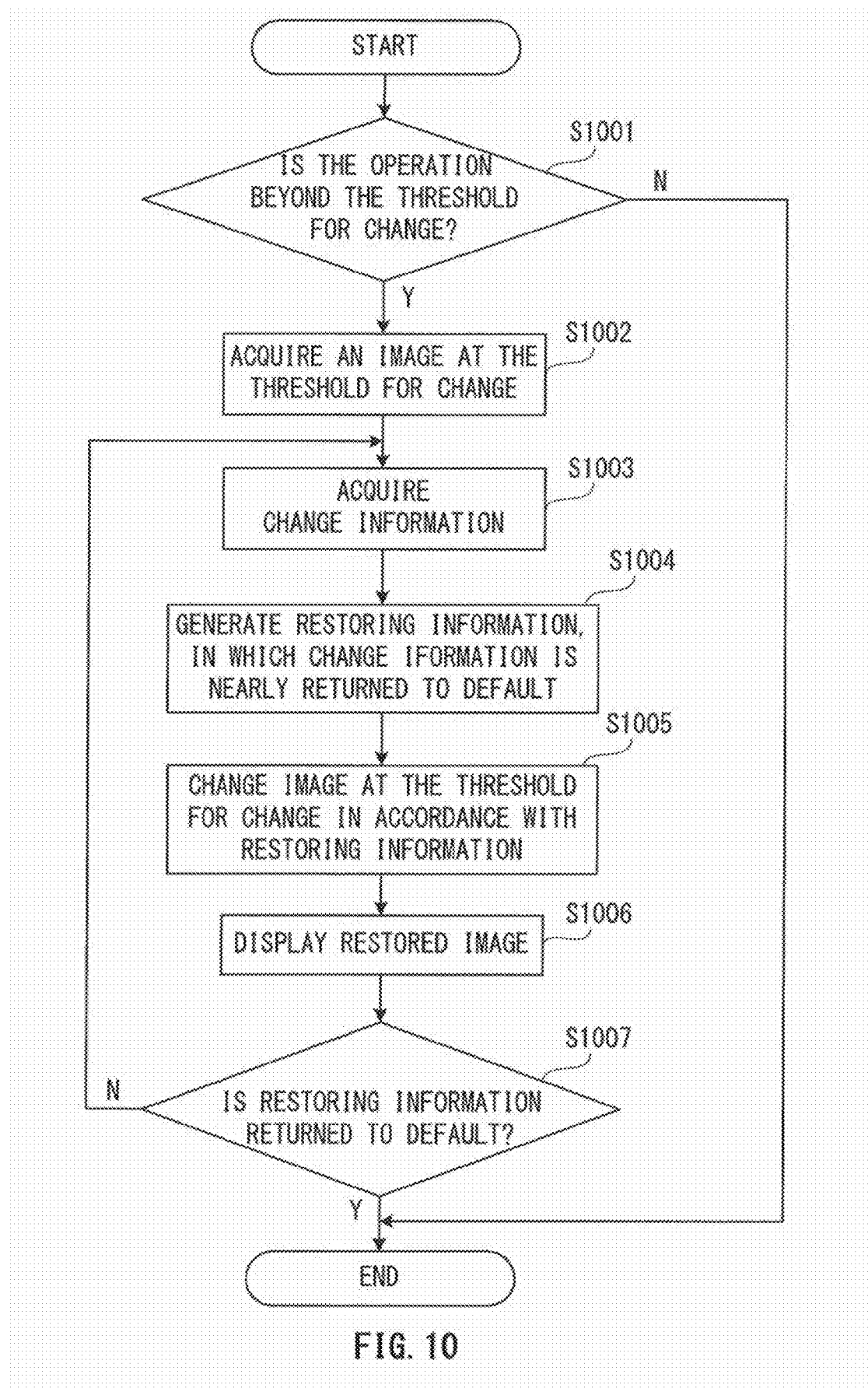
FIG. 10 is a flow chart illustrating a processing procedure when the operation is terminated.

FIG. 10 is a flow chart illustrating a processing procedure at the time of ending the change by the display control device 900. At step S301 as shown in FIG. 3, in a case where the end operation acquisition unit 908 detects the end instruction, the processing is moved to the processing to end the change.

The excess amount acquisition unit 203 determines, at the time of acquiring the end instruction by the acquisition unit 908, whether or not the change at the time of acquiring the end instruction is made beyond the threshold value for change (S1001). The determination result of the previous operation at step S303 may be used to make the determination.

If the change at the time of acquiring the end instruction is not beyond the threshold value for change, the image changing unit 206, at which the changed content is generated in accordance with the operation amount, ends the display control processing as it is (S1001: N).

If the change at the time of acquiring the end instruction is beyond the threshold value for change (S1001: Y), the drawing result acquisition unit 204 acquires the image at the threshold for change (S1002). The image at the threshold for change as acquired is yet to be drawned on the touchscreen. In a case where the zoom-in operation is executed, the drawing result acquisition unit 204 acquires the content image at the maximum zoom-in ratio, which is defined as the threshold for change to zoom in, as the image at the threshold for change.

After the image at the threshold for change is acquired, the restoring information generation unit 909 acquires current change information (S1003). After the current change information is acquired, the restoring information generation unit 909 generates the restoring information, in which the change information is nearly returned to the default (S1004). The restoring information generation unit 909 generates restoring information such that the mesh is changed in an opposite manner as described at step S306 to obtain the grid-like mesh, which is not distorted. At this time, a predetermined time t may be taken to gradually return the mesh to the default. The mesh may gradually be returned to the default at a constant rate. Further, some coefficient may be multiplied so as to allow the mesh to return to the default at a high rate at first, and then the rate may be reduced to slowly return to the default.

The image restoring unit 910 generates a restored image in which the image at the threshold for change acquired at step S1002 is changed in accordance with the restoring information (S1005). The image restoring unit 910 generates the restored image by executing texture mapping of the image at the threshold for change in accordance with the restoring information. The display unit 207 draws the restored image on the touchscreen (S1006). After the restored image is drawn on the touchscreen, the restoring information generation unit 909 determines whether the restoring information is returned to the default grid-like mesh (S1007). That is, if the mesh is returned to the grid-like mesh, which is not distorted, the processing ends (S1007: Y). If the mesh is not returned to the default (S1007: N), the processing goes back to the processing of step S1003.

The display control device 900 continues the processing in this manner until the displayed image is updated to the image at the threshold for change. This enables to show that the image as changed returns to the original state in a natural manner.

[Zoom-Out Operation]

Next, description will be made with regard to a processing to zoom out the content for display, in which a touch operation is executed to decrease a distance between two fingers on the touchscreen. The processing procedure for executing zoom-out operation of the content will be described using the flowchart as shown in FIG. 3.

The detecting unit 201 detects movement information of touch position at which the user touches the touchscreen with his first finger and second finger. The operation acquisition unit 202 acquires a change instruction, given by the user, to change the representation form of the content based on the movement information detected by the detecting unit 201. In this example, the movement information which shows that the distance between the two fingers is decreased is detected, so that the operation acquisition unit 202 acquires the instruction to zoom out the content (S301). At this time, when the ending instruction, such as lifting the finger off the touchscreen, is detected, the processing is moved to the processing as shown in FIG. 10.

The change instruction acquired by the operation acquisition unit 202 is the zoom-out instruction. Therefore, the excess amount acquisition unit 203 calculates the difference between the operation amount of finger at which minimum zoom-in ratio, which is defined as the threshold value for change of the content, can be gained and the operation amount detected by the detecting unit 201. If the operation amount of finger detected by the detecting unit 201 exceeds the threshold value for change, the difference will be the excess amount (S302).

The excess amount acquisition unit 203 determines whether the zoom-out instruction of the content is beyond the threshold for change (S303).

If it is determined that the operation amount is below the threshold value for change, that is, the zoom-out instruction as given is not beyond the threshold for change (S303: N), the image changing unit 206 calculates the zoom-out ratio in accordance with the operation amount. The image changing unit then generates the content which is zoomed out at the zoom-out ratio. The display unit 207 displays the generated content on the touchscreen display (S304).

If it is determined that the operation amount is beyond the threshold value for change (S303: Y), the drawing result acquisition unit 204 acquires the image at the threshold for change, which is the content generated at the minimum zoom-out ratio, which is defined as the threshold for change to zoom out (S305). When the processing is first executed, the image at the threshold for change is generated. The image as first generated is used for the second and the subsequent processing. The image at the threshold for change is yet to be drawn on the touchscreen.

Upon acquisition of the image at the threshold for change, the change information generation unit 205 generates the change information using the mesh (S306). The change information generation unit 205 generates the change information by the mesh based on the touch position at which the user terminated his finger operation, the operation direction, and the excess amount. The change of the mesh will be described later.

The image changing unit 206 changes the image at the threshold for change acquired at step S305 in accordance with the change information (S307). The image changing unit 206 generates the changed image by executing texture mapping of the image at the threshold for change in accordance with the change information. The changed image is mapped on the mesh where is changed so that the changed image will be a distorted content. Further, the degree of the content distortion can be changed in accordance with the excess amount.

The display unit 207 displays the generated changed image on the touchscreen display (S308). The zoom-out processing of the content ends in this manner.

Description will be made with regard to changing mesh at step S306.

Figure 11A:
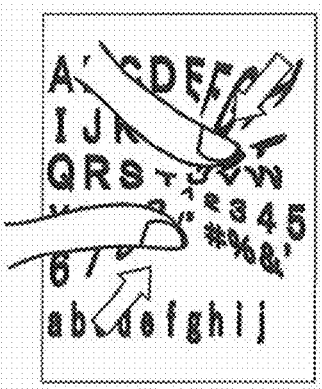
FIGS. 11A, 11B, 11C, and 11D are diagrams exemplifying the content.

FIG. 11A is a diagram exemplifying the content as illustrated in FIG. 6A, in which the zoom-out processing is executed and the content is changed around the user's finger positions at which the user terminated his finger operation.

Description will be made with regard to changing mesh at step S306. It is noted that, coordinate used to change mesh is two dimensional (2D) plane coordinate or three dimensional (3D) space coordinate as defined to entirely include the touchscreen display area.

The change information generation unit 205 acquires, from the excess amount acquisition unit 203, vector v(vx, vy) representing the excess amount and the operation direction of the first finger. The vector v is multiplied by an appropriate coefficient c (0<c≤1), which shall be a basic coordinate movement amount. A distance from a line which is in parallel with a bisector to the coordinates (x, y) of the mesh intersection subject for movement is defined as a distance d. The bisector in this case is a perpendicular bisector of the coordinate points of the first finger and the second finger at which the first finger and the second finger respectively terminated each operation, and the bisector passes the coordinate of the first finger. Then, the movement amount of the intersection can be expressed by the expression as shown in FIG. 4A. This expression is applied to each mesh intersection to change mesh. The coordinates of point (x', y') after the change is made to the coordinates of the intersection (x, y) can be expressed by the expression as shown in FIG. 4B. The intersection subject for movement is the intersection located in a unit where the first finger is positioned bordering the perpendicular bisector. The intersection, which corresponds to the edge of the content subject for operation, will not be moved. By moving the location at which the mesh intersection is shown, the mesh is changed. Then, the image of the content accordingly changed is generated.

The same processing will be executed with regard to the second finger. In this case, vector v (vx, vy) represents the excess amount and the operation direction of the second finger. A distance from a line which is in parallel with a perpendicular bisector to the coordinates (x, y) of the mesh intersection subject for movement is defined as a distance d. The bisector in this case is a perpendicular bisector of the coordinate points of the first finger and the second finger at which the first finger and the second finger respectively terminated each operation and the bisector passes the coordinates of the second finger. The intersection subject for movement is the intersection located in a unit where the second finger is positioned bordering the perpendicular bisector.

The change can only be made in a region defined between the first finger and the second finger.

Figure 12A:
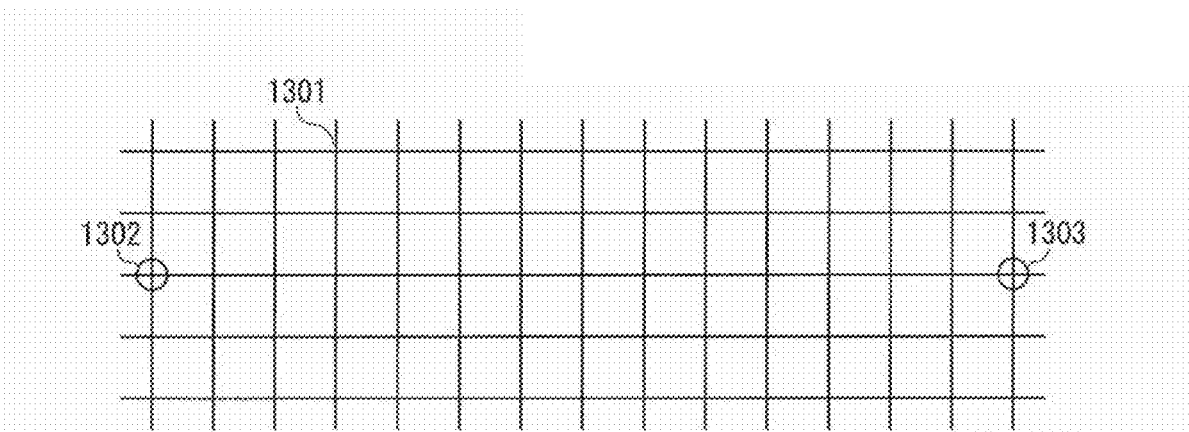
FIG. 12A is a diagram exemplifying mesh before any change is made to the mesh.

FIG. 12A is a diagram exemplifying a grid-like mesh 1301 before any change is made to the mesh. The first finger position 1302 and the second finger position 1303 are respectively located on the content.

Figure 12B:
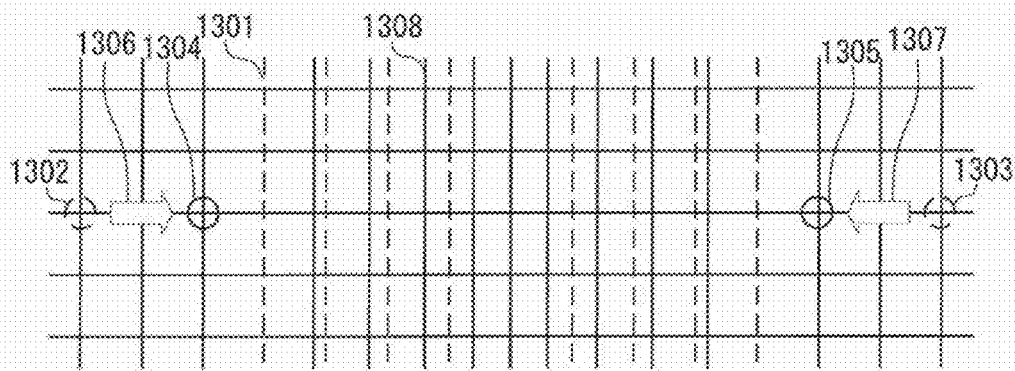
FIGS. 12B and 12C are diagrams exemplifying mesh after the change is made to the mesh.

FIG. 12B is a diagram exemplifying a case where the mesh 1301 as illustrated in FIG. 12A is changed. By executing the zoom-out operation, the first finger position 1302 is moved toward the position 1304 and the second finger position 1303 is moved toward the position 1305. The change information generation unit 205 acquires, from the excess amount acquisition unit 203, vector v1306, representing the excess amount and the operation direction of the first finger, and vector v1307, representing the excess amount and the operation direction of the second finger. The dashed line represents the mesh 1301 before any change is made to the mesh. Each intersection which lies between the first finger position 1304 and the second finger position 1305 located on the mesh 1301 is moved. The movement amount varies, however, depending on the distance from the perpendicular bisector to the first finger position 1304 and the distance from the perpendicular bisector to the second finger position 1305. Connecting the intersections as moved generates change information 1308.

Figure 11B:
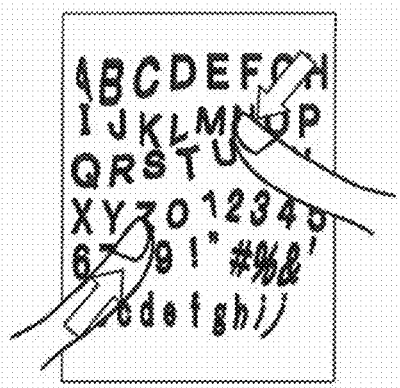

FIG. 11B is a drawing image of the content acquired by the change information 1308 as illustrated in FIG. 12B, in which visual effect is given to the user that, since the content as changed in accordance with the finger movement is beyond the threshold for change, the content is forcedly squeezed.

The mesh may be changed as follows.

In a case where 3D (three-dimensional) appearance is visually given to the user, the distorted mesh, which is an object and lies between the first finger touch position and the second finger touch position, is drawn such that the mesh is shaded to give the visual effect that the object is depressed like a hollow.

When such a change is made, the change information generation unit 205 generates the change information, in which change to the 3D direction including the z-axis is represented. The change information generation unit 205 acquires, from the excess amount acquisition unit 203, vector v (vx, vy) representing the excess amount and the orientation direction of the first finger. The vector v is multiplied by an appropriate coefficient c (0<c≤1), which shall be a basic coordinate movement amount. The coordinate movement amount to the negative direction of the z-axis is represented by the coordinate movement amount vz. A distance from a line which is in parallel with a bisector to the coordinate (x, y, z=0) of the mesh intersection subject for movement is defined as a distance d. In this case, the bisector is a perpendicular bisector of the coordinate points of the first finger and the second finger at which the first finger and the second finger respectively terminated each operation and which passes the coordinates of the first finger. As to the z-axis, a distance from a bisector to the coordinate (x, y, z=0) of the mesh intersection subject for movement is defined as a distance d. In this case, the bisector is a perpendicular bisector of the coordinate points of the first finger and the second finger at which the first finger and the second finger respectively terminated each operation. At this time, the movement amount of the intersection can be expressed by, for example, the expression as shown in FIG. 4A. This expression is applied to each mesh intersection to change the mesh. The intersection, which corresponds to the edge of the content subject for operation, will not be moved. The coordinates (x', y', z'') of the point after the change is made to the coordinates (x, y, z=0) of the intersection can be expressed by the expression as shown in FIG. 4C. The change may only be made in a region defined between the first finger and the second finger. Further, the change may be made to somewhat outside region.

Next, shadow is drawn. There are several methods which are well-known for drawing the shadow. Following shows, for example, one of the methods. Here, a surface normal vector for drawing shadow is defined as vector n. A light source vector oriented toward the light source which illuminates the surface from the surface is defined as vector l. A viewpoint vector oriented toward the surface is defined as vector V. Then, a regular reflection vector r representing an orientation of the light reflected from the surface can be expressed by "r=2(n*l)n−1". The normal vector n, the light source vector l, the viewpoint vector v and the regular reflection vector r respectively are unit vectors. Then, the inner product of the viewpoint vector v and the regular reflection vector r is calculated. The viewpoint vector v and the regular reflection vector r both are the unit vectors so that the inner product value will be between "−1" and "1". In a case where the inner product is "1", the surface becomes the brightest since the viewpoint vector v and the regular reflection vector r are oriented toward the same direction. The shadow is drawn darker for the inner product close to "0". The shadow is drawn lighter for the inner product close to "1". The inner product less than "0" is deemed "0". The shadow is drawn in accordance with the brightness based on the inner product value. The shadow is drawn, for example, at step S307 of FIG. 3.

Figure 12C:
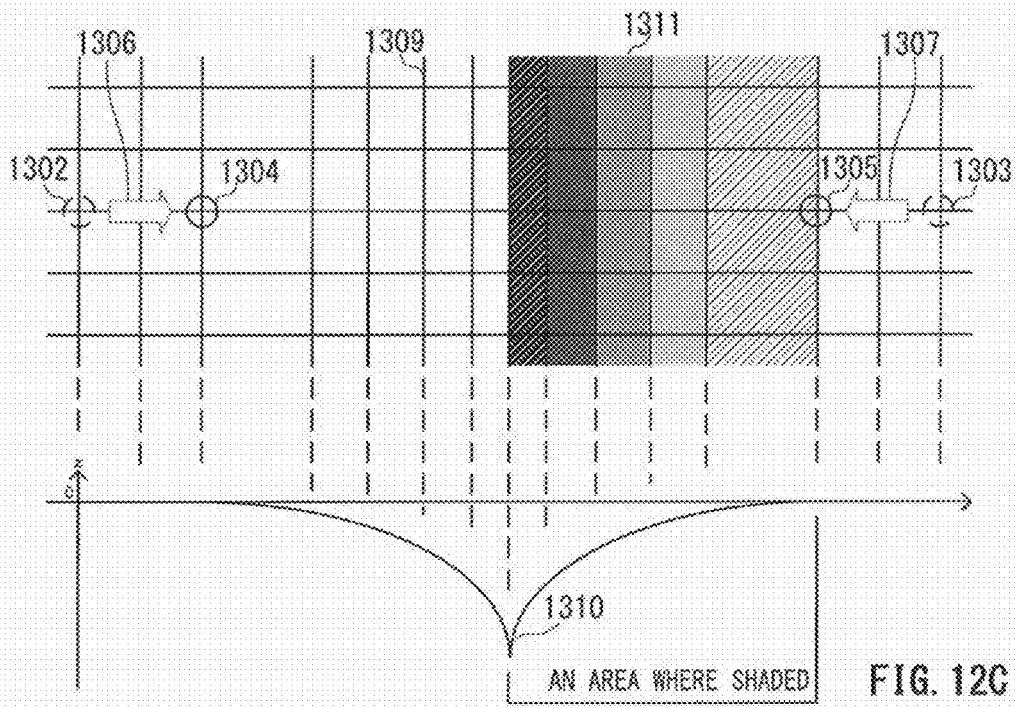

FIG. 12C is a diagram exemplifying a case where the mesh 1301 as illustrated in FIG. 12A is changed. By executing zoom-out operation, the first finger position 1302 is moved toward the position 1304 and the second finger position 1303 is moved toward the position 1305. The change information generation unit 205 acquires, from the excess amount acquisition unit 203, vector v1306, representing the excess amount and the operation direction of the first finger, and vector v1307, representing the excess amount and the operation direction of the second finger. Connecting the intersections as moved between the first finger position 1304 and the second finger position 1305 generates change information 1309. Further, the change information 1309 includes the axial component of z-axis. Graph 1310 represents value of the change information 1309 in z-axis. Shadow 1311 is drawn based on the change information 1309.

Figure 11C:
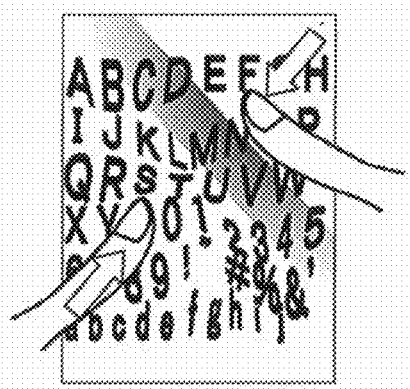

FIG. 11C is a drawing image of the content acquired by the change information 1309 as illustrated in FIG. 12C, in which visual effect is given to the user that, since the content as changed in accordance with the finger movement is beyond the threshold for change, the content is forcedly and deeply depressed.

The mesh may be changed as follows.

In a case where 3D (three-dimensional) appearance is visually given to the user, the distorted mesh, which is an object and lies between the first finger touch position and the second finger touch position, is drawn such that the mesh is shaded to give the visual effect that the object is raised like a mountain.

When such a change is made, the change information generation unit 205 generates the change information, in which change to the 3D direction including the z-axis is represented. The change information generation unit 205 acquires, from the excess amount acquisition unit 203, vector v(vx, vy) representing the excess amount and the operation direction of the first finger. The vector v is multiplied by an appropriate coefficient c ($0<c\leq1$), which shall be a basic coordinate movement amount. Further, a distance from a bisector to the coordinates (x, y, z=0) of the mesh intersection subject for movement is defined as a distance d. In this case, the bisector is a perpendicular bisector of the coordinate points of the first finger and the second finger at which the first finger and the second finger respectively terminated each operation in z-axis direction. At this time, the movement amount of the coordinates (x, y) of the intersection can be expressed by the expression as shown in FIG. 4A. A point z can be expressed by the expression as shown in FIG. 4F, in which an appropriate coefficient c' ($0<c'$) for adjusting the degree of the raise is used. The expression is applied to each mesh intersection to change grid. The intersection, which corresponds to the edge of the content subject for operation, will not be moved. The coordinates (x', y', z') of the point after the change is made to the coordinates (x, y, z=0) of the mesh intersection can be expressed by the expression as shown in FIG. 4G. The change may only be made in a region defined between the first finger and the second finger, or the change may be made to somewhat outer region.

A method for drawing shade is similar to that as above. Therefore, description thereof will be omitted.

Figure 13A:
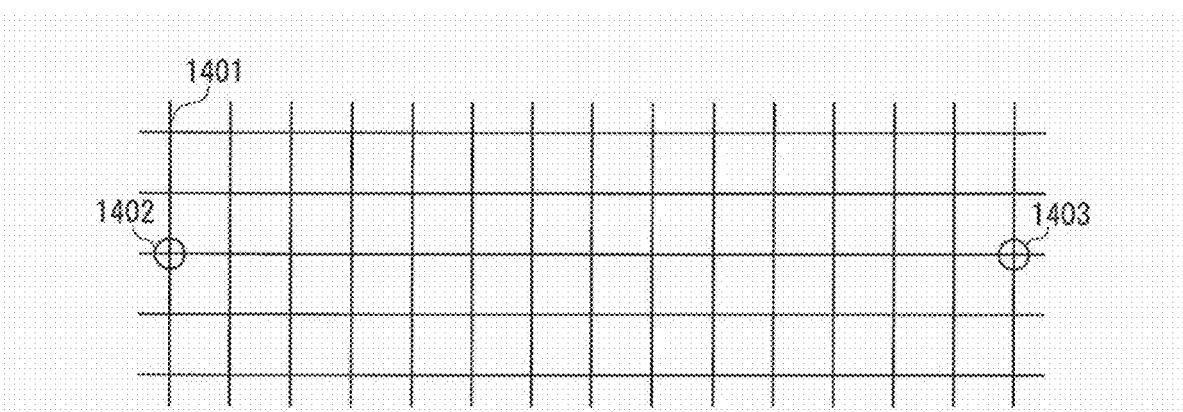
FIG. 13A is a diagram exemplifying mesh before any change is made to the mesh.

FIG. 13A is a diagram exemplifying a grid-like mesh 1401 before any change is made to the mesh. The first finger position 1402 and the second finger position 1403 are respectively located on the content.

Figure 13B:
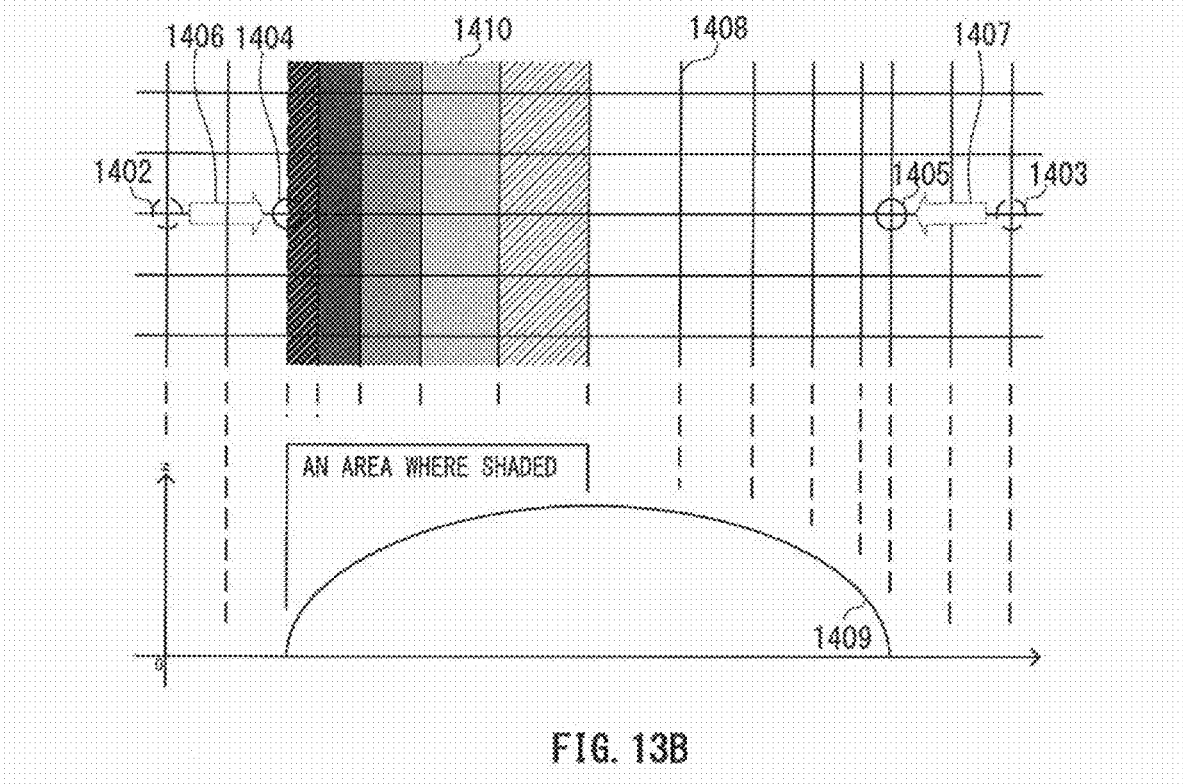
FIG. 13B is a diagram exemplifying mesh after the change is made to the mesh.

FIG. 13B is a diagram exemplifying a case where the mesh 1401 as illustrated in FIG. 13A is changed. By executing zoom-out operation, the first finger position 1402 is moved toward the position 1404 and the second finger position 1403 is moved toward the position 1405. The change information generation unit 205 acquires, from the excess amount acquisition unit 203, vector v1406, representing the excess amount and the operation direction of the first finger and vector v1407, representing the excess amount and the operation direction of the second finger. Connecting the intersections as moved between the first finger position 1404 and the second finger position 1405 generates change information 1408. Further, the change information 1408 includes the axial component of z-axis. Graph 1409 represents value of the change information 1408 in z-axis. Shadow 1410 is drawn based on the change information 1408.

Figure 11D:
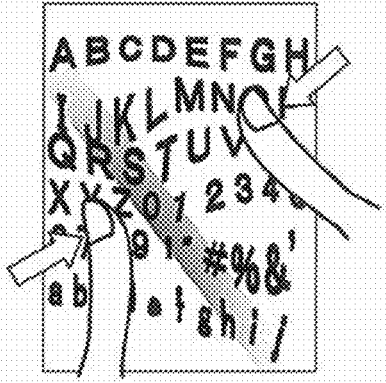

FIG. 11D is a drawing image of the content acquired by the change information 1408 as illustrated in FIG. 13B, in which visual effect is given to the user that, since the content as changed in accordance with the finger movement is beyond the threshold for change, the content is forcedly raised.

The mesh may be changed as follows.

Another example is given in a case where 3D (three-dimensional) appearance is visually given to the user. In this case, an object, which is a mesh as distorted and lies between the first finger touch position and the second finger touch position, is used. Drawing is made to shade the object so as to give the visual effect that the object is crimpy and bumpy.

When such a change is made, the change information generation unit 205 generates the change information, in which change to the 3D direction including z-axis direction is represented. The change information generation unit 205 acquires, from the excess amount acquisition unit 203, vector v(vx, vy) representing the excess amount and the operation direction of the first finger. The movement amount toward the z-axis is expressed, for example, sine (sin) function, which moves in the positive direction and negative direction at a constant period. Further, if the excess amount is large, frequency or amplitude accordingly becomes large. A coefficient for adjusting the amplitude is defined as coefficient c ($0<c$). A coefficient for adjusting the frequency is defined as coefficient c'($0<c'$). A distance from the coordinate point of the first finger at which the first finger terminated its operation to the coordinate (x, y, z=0) of the mesh intersection subject for movement is defined as a distance d. Then, the movement amount of the intersection in z-axis can be expressed by the following expression.

$$c|v|\sin(c'|v|d)$$

The expression is applied to each mesh intersection to change mesh. The coordinates (x', y', z') of the point after the change is made to the coordinates (x, y, z=0) of the intersection can be expressed by (x, y, c|v|sin (c'|v|d)). The change is only made in a region defined between the first finger and the second finger.

A method for drawing a shade is similar to that as above. Therefore, description thereof will be omitted.

Figure 14A:
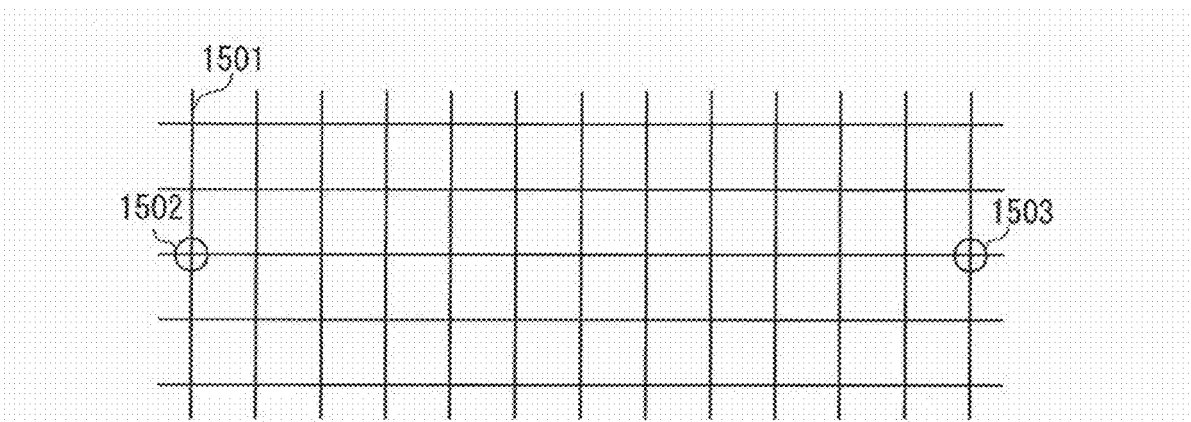
FIG. 14A is a diagram exemplifying mesh before any change is made to the mesh.

FIG. 14A is a diagram exemplifying a grid-like mesh 1501 before any change is made to the mesh. The first finger position 1502 and the second finger position 1503 are respectively located on the content.

Figure 14B:
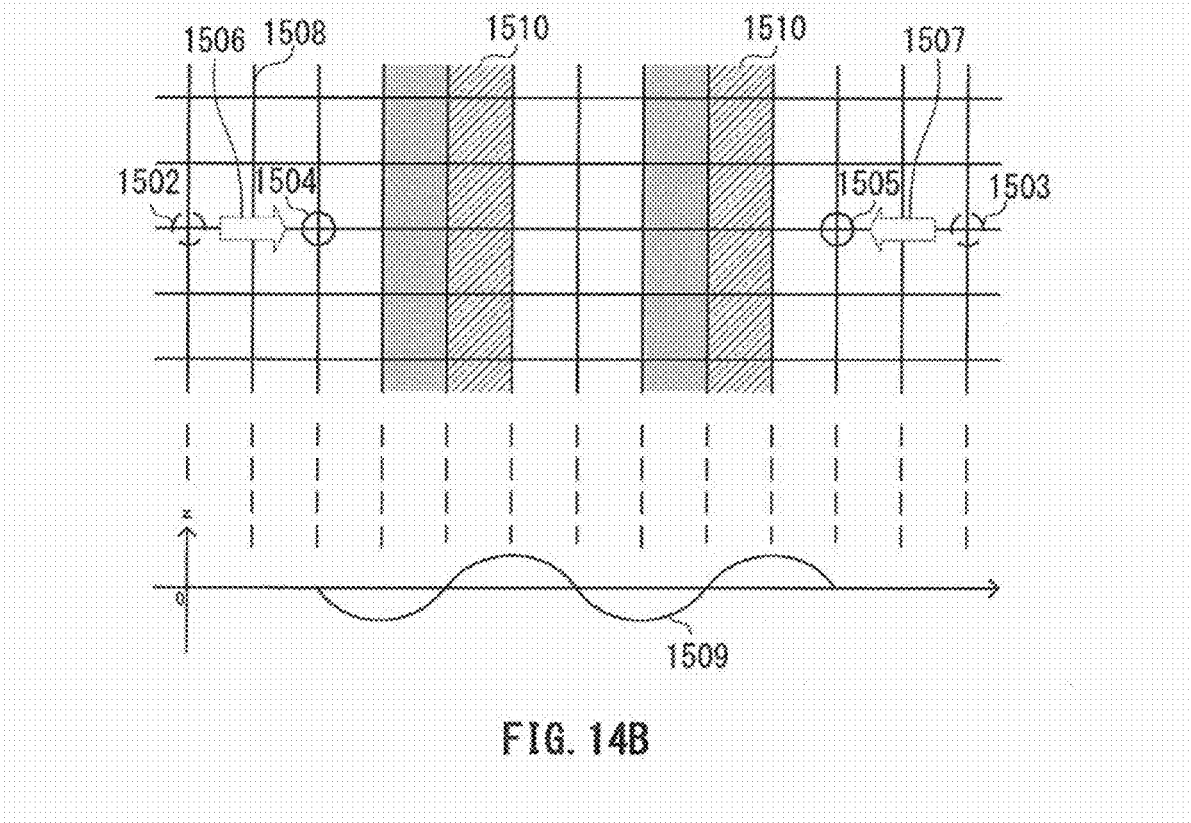
FIG. 14B is a diagram exemplifying mesh after the change is made to the mesh.

FIG. 14B is a diagram exemplifying a case where the mesh 1501 as illustrated in FIG. 14A is changed. By executing zoom-out operation, the first finger position 1502 is moved toward the position 1504 and the second finger position 1503 is moved toward the position 1505. The change information generation unit 205 acquires, from the excess amount acquisition unit 203, vector v1506, representing the excess amount and the operation direction of the first finger and vector v1507, representing the excess amount and the operation direction of the second finger. Connecting the intersections as moved between the first finger position 1504 and the second finger position 1505 generates change information 1508. Further, the change information 1508 includes the axial component of z-axis. Graph 1509 represents value of the change information 1408 in z-axis. A shadow 1508 is drawn based on the change information 1510.

Figure 15A:
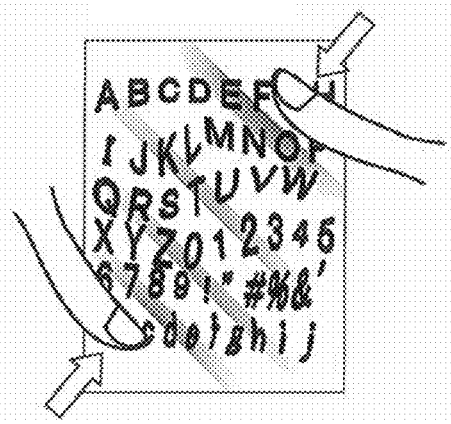
FIGS. 15A, 15B, 15C, and 15D are diagrams exemplifying the content.

FIG. 15A is a drawing image of the content acquired based on the change information 1508 as illustrated in FIG. 14B, in which visual effect is given to the user that, since the content as changed in accordance with the finger movement is beyond the threshold for change, the content is crimpy.

The mesh may be changed as follows.

Figure 15B:
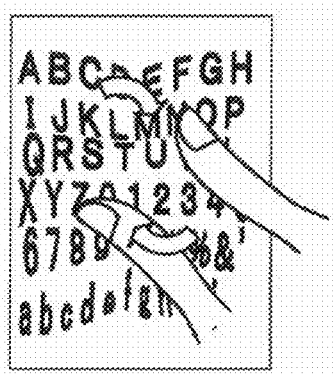

The mesh located outside the position of the first finger at which the first finger terminated its operation, or located outside the position of the second finger at which the second finger terminated its operation is entirely distorted in the direction of the operation of excess amount. The region defined between the first finger and the second finger displays the content as reduced in accordance with the zoom-out operation as it is. FIG. 15B is a drawing image of the content acquired as a result of the change.

With the display control device 200 as above, in a case where the zoom-out operation is executed beyond the threshold for change, the content is distorted, which enables the user to easily recognize the excess of the threshold for change. Further, the change in the degree of the content distortion content teaches the user to what extent the threshold for change is exceeded by the zoom-out operation, which enables to visually show the excess to the user.

[Rotation Processing]

Description will be made with regard to a content rotation processing by touch operation, in which two fingers are moved in an arc on the touchscreen. Description will be made, using a flowchart as shown in FIG. 3, with regard to the processing procedure for executing the content rotation processing.

The detecting unit 201 detects the movement information of the touch position at which user touches the touchscreen with his first finger and second finger. The operation acquisition unit 202 acquires a change instruction, given by the user, to change the representation form based on the movement information detected by the detecting unit 201. In this example, based on the movement information showing that the two fingers were moved in arc on the touchscreen, the operation acquisition unit 202 acquires an instruction to rotate the content (S301). At this time, when an ending instruction, such as lifting the finger off the touchscreen, is detected, the processing is moved to the processing as shown in FIG. 10.

The change instruction acquired by the operation acquisition unit 202 is the instruction to rotate. Therefore, the excess amount acquisition unit 203 calculates the difference between operation amount (angle of rotation) of the finger, from which the rotation amount, which is defined as the threshold value for change of the content, can be gained and the angle of rotation of the finger as detected by the detecting unit 201. In a case where the angle of rotation of the finger as detected by the detecting unit 201 exceeds the threshold value for change, the angle of the difference will be the excess amount (S302).

The excess amount acquisition unit 203 determines whether the instruction to rotate is beyond the threshold value for change (S303).

If it is determined that the angle of rotation is below the threshold value for change, that is, the rotation as instructed is not beyond the threshold value for change (S303: N), the image changing unit 206 calculates the rotation amount in accordance with the angle of rotation. The image changing unit 206 then generates the content which is rotated by the rotation amount. The display unit 207 displays the generated changed image on the touchscreen display (S304).

If it is determined that the angle of rotation is beyond the threshold value for change (S303: Y), the drawing result acquisition unit 204 acquires the threshold image, which is the content as generated at the angle of rotation, which is defined as the threshold for change of the rotation (S305). When the processing is first executed, the image at the threshold for change is generated. The image as first generated is used for the second and the subsequent processing.

The image as first generated is used for the second and the subsequent processing. The image at the threshold for change is yet to be drawn on the touchscreen.

Upon acquisition of the image at the threshold for change, the change information generation unit 205 generates the change information using the mesh (S306). The change information generation unit 205 generates the change information by distorting the mesh based on the touch position at which the user terminated his finger operation, the operation direction, and the excess amount. The change of the mesh will be described later.

The image changing unit 206 changes the image at the threshold for change acquired at step S305 in accordance with the change information (S307). The image changing unit 206 generates the changed image by executing texture mapping of the image at the threshold for change in accordance with the change information. The changed image is mapped on the mesh which is changed, thus, the changed image will be a distorted content. Further, the degree of the content distortion can be changed depending on the excess amount.

The display unit 207 displays the generated changed image on the touchscreen display (S308). The content rotation processing ends in this manner.

It is noted that, the rotating operation is executed at step S301, through a gesture of keeping the first finger fixed on the screen while moving the second finger alone in an arc. In this case, the first finger is centered and the change is made in accordance with the movement of the second finger.

Description will be made with regard to changing mesh at step S306. It is noted that, coordinate used to change mesh is two dimensional (2D) plane coordinate or three dimensional (3D) space coordinate as defined to entirely include the touchscreen display area.

The change information generation unit 205 acquires, from the excess amount acquisition unit 203, an angle θ, representing the excess amount and the operation direction of the first finger. The angle θ is multiplied by an appropriate coefficient (0<c≤1), which shall be a basic coordinate movement amount. A distance from the position of the first finger at which it terminated its operation at the threshold for change of the content to the coordinates (x, y) of the mesh intersection subject for movement is defined as a distance d. Then, the rotation amount of the intersection can be expressed by, for example, the expression as shown in FIG. 4D. The expression is applied to each mesh intersection to change mesh. The coordinates (x', y') of the point after the change is made to the coordinates (x, y) of the intersection can be expressed by the expression as shown in FIG. 4E. By moving the position at which the mesh intersection is shown to change mesh, the representation form of the content is changed.

The same processing will be executed with regard to the second finger. In this case, angle θ represents the excess amount of the second finger.

It is noted that, change may not be made with regard to the point which is away from the center of the rotating operation over a constant distance. Further, the change may be made to the point within the region of an arc with the angle θ, the center point of which is the center of the rotating operation, and the arc includes an area of the touch position of the first finger. Alternatively, only the points included in an ellipse defined with a first focal point and a second focal point may be moved. In this case, the first focal point is the touch position of the first finger or the second finger, and the second focal point is the touch position of the first finger or the second finger at which the maximum rotating angle, which is defined as the threshold for change of the content, is obtained. Further the intersection, which corresponds to the edge of the content subject for operation, will not be moved.

Figure 16A:
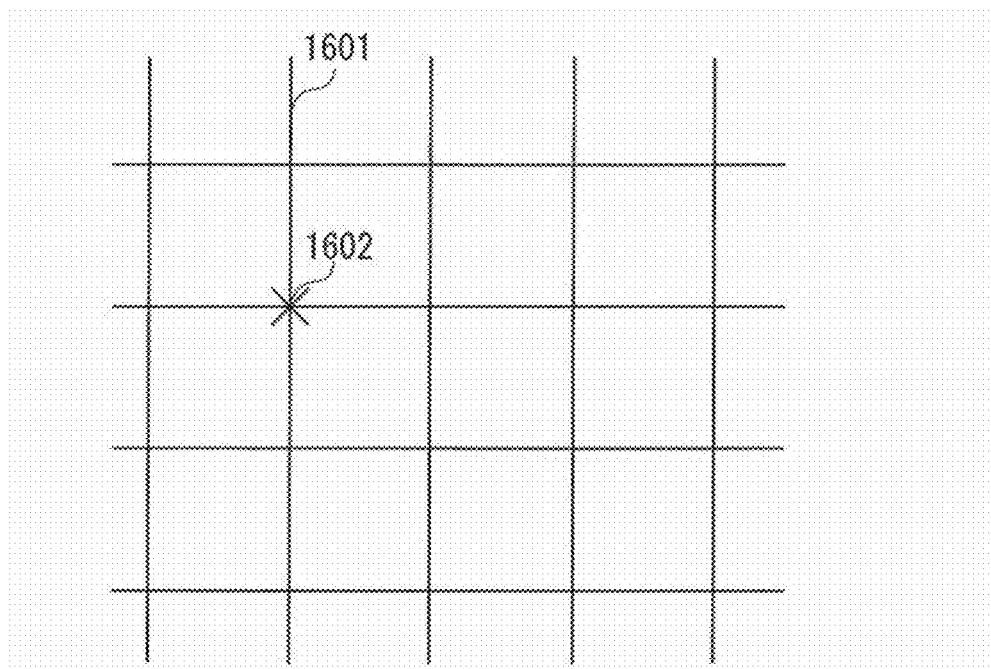
FIG. 16A is a diagram exemplifying mesh before any change is made to the mesh.

FIG. 16A is a diagram exemplifying a grid-like mesh 1601 before any change is made. The first finger position 1602 is located on the content. The second finger position is also located on the content. It, however, is located outside the mesh as illustrated in FIG. 16A.

Figure 16B:
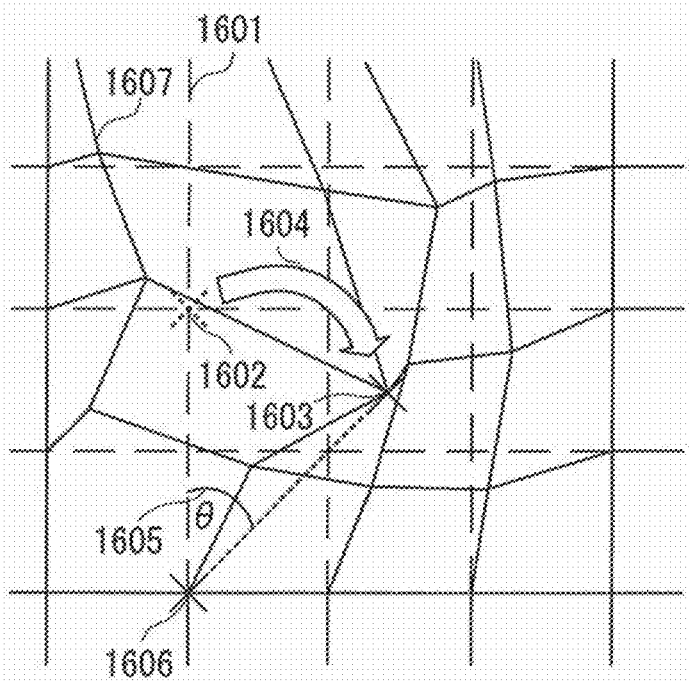
FIG. 16B is a diagram exemplifying mesh after the change is made to the mesh.

FIG. 16B is a diagram exemplifying a case where the mesh 1601 as illustrated in FIG. 16A is changed. By executing rotating operation, the first finger position 1602 is moved toward the position 1603 in an arc 1604. In a case where point 1606 is centered for the rotating operation, the change information generation unit 205 acquires, from the excess amount acquisition unit 203, an angle θ1605, representing the excess amount and operation direction of the first finger. The dashed line represents the mesh 1601 before any change is made to the mesh. Each intersection located on the mesh 1601 is moved around, such as rotated, a point 1606 as a center along the direction 1604 toward which the first finger is moved. Connecting the intersections as moved generates change information 1607.

Figure 15C:
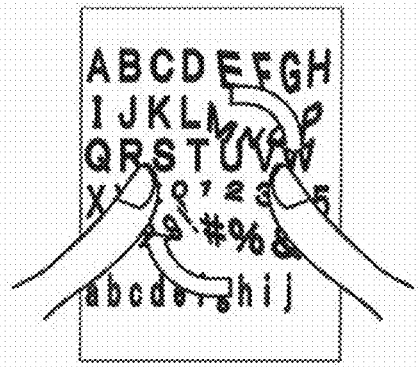

FIG. 15C is a drawing image of the content acquired by applying the change information 1607 as illustrated in FIG. 16B near the touch position of the first finger and the touch position of the second finger, in which visual effect is given to the user that the content is twisted since the content as changed in accordance with the finger movement is beyond the threshold for change.

Figure 15D:
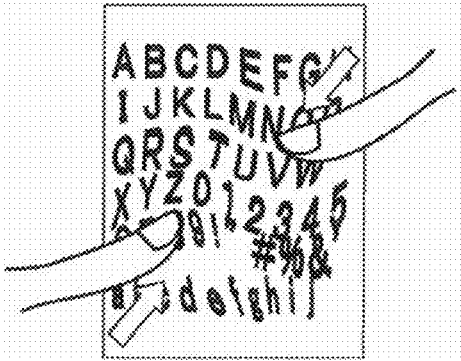

FIG. 15D is a drawing image of the content acquired by applying the change information 1607 as illustrated in FIG. 16B within a certain distance from the center of the rotating operation, in which visual effect is given to the user that, since the content as changed in accordance with the finger movement is beyond the threshold for change, the content is oddly rotated.

The display control device 200 as above causes the content to distort in a case where the rotating operation is executed beyond the threshold for change, which enables the user to easily recognize the excess of the threshold for change. Further, the change in the degree of the content distortion teaches the user to what extent the threshold for change is exceeded by the rotating operation, which enables to visually show the excess to the user.

[Scroll Processing]

Description will be made with regard to processing for scrolling (translating) content through a gesture to move finger in one direction on the touchscreen. The processing procedure for executing the processing for scrolling content will be described using the flowchart as shown in FIG. 3.

The detecting unit 201 detects the movement information of touch position at which user touches the touchscreen with his user. The operation acquisition unit 202 acquires a change instruction, given by the user, to change a representation form based on the movement information detected by the detecting unit 201. In this example, the finger moves on the touchscreen in one direction so that the operation acquisition unit 202 recognizes scroll operation (S301). At this time, when an ending instruction, such as lifting the finger off the touchscreen, is detected, the processing is moved to the processing as shown in FIG. 10.

The change instruction acquired by the operation acquisition unit 202 is the scroll instruction. Therefore, the excess amount acquisition unit 203 calculates the difference between the operation amount of finger, which is defined as the threshold for change of the content, and the operation amount of finger as detected by the detecting section 201. In a case where the operation amount of finger as detected by the detecting unit 201 exceeds the threshold value for change, the difference will be the excess amount (S302). At this time, the finger position, where is defined as the threshold for change of the content, may be memorized.

The excess amount acquisition unit 203 determines whether the instruction to scroll is beyond the threshold value for change (S303).

If it is determined that the operation amount is below the threshold value for change, that is, the scrolling as instructed is not beyond the threshold for change (S303: N), the image changing unit 206 calculates the scroll amount in accordance with the operation amount. The image changing unit 206 then generates the content which is scrolled by the scrolled amount. The image changing unit 207 displays the generated content on the touchscreen display (S304).

If it is determined that operation amount is beyond the threshold value for change, the drawing result acquisition unit 204 acquires the image at the threshold for change (S303: Y, 305), which is the content at a scroll end position, which is defined as the threshold for change of the scrolling. When the processing is first executed, the image at the threshold for change is generated. The image as first generated is used for the second and the subsequent processing. The image at the threshold for change is yet to be drawn on the touchscreen.

Upon acquisition of the image at the threshold for change, the change information generation unit 205 generates the change information. The change information is generated by changing, such as distorting the mesh, in which the display area of the image at the threshold for image is partitioned in a grid-like manner at equal spaces, based on the touch position at which the user terminated his finger operation, the operation direction, and the excess amount to generate the change information (S306).

The image changing unit 206 changes the image at the threshold for change acquired at step S305 in accordance with the change information (S307). The image changing unit 206 generates the changed image by executing texture mapping of the threshold image in accordance with the change information. The changed image is mapped on the mesh where is changed so that the changed image will be a distorted content. Further, the degree of the content distortion can be changed depending on the excess amount.

The display unit 207 displays the generated changed image on the touchscreen display (S308). The content scroll processing ends in this manner.

Figure 17A:
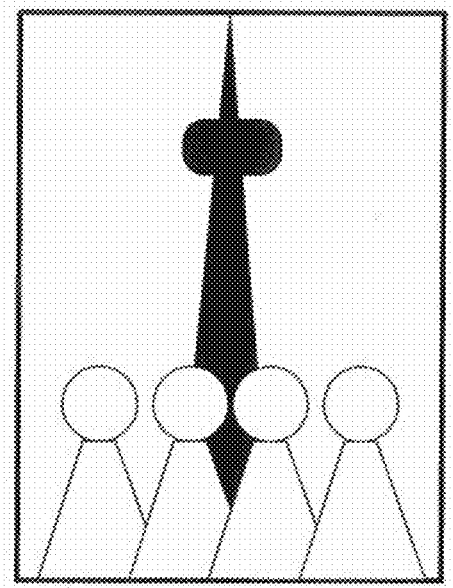
FIGS. 17A and 17B are diagrams exemplifying the content.

FIG. 17A is a diagram exemplifying the content at the threshold for change (at which lateral scrolling is no longer allowed).

Figure 17B:
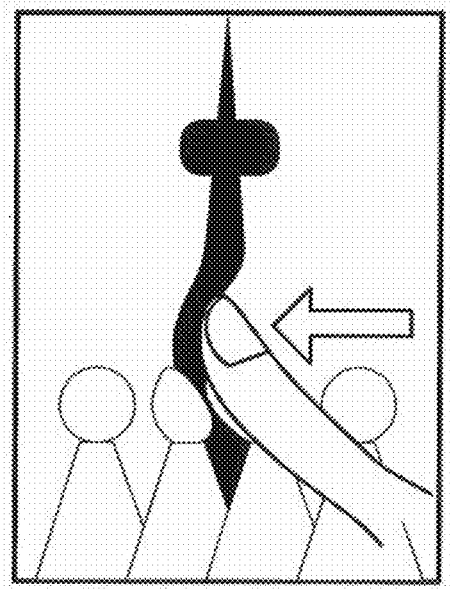

FIG. 17B is a diagram exemplifying a case where change is made to the drawing result of the content as illustrated in FIG. 17A by lateral scrolling, in which visual effect is given to the user that, since the content as changed in accordance with the finger movement is beyond the threshold for change, the image is forcedly strained.

The display control device 200 as above causes the content to distort when the scroll operation is executed beyond the threshold for change, which enables the user to easily recognize the excess of the threshold for change. Further, the change in the degree of the content distortion teaches the user to what extent the threshold for change is exceeded by the scroll operation, which enables to visually show the excess to the user.

It is noted that, the display control of the display control device 200 is able to simultaneously, instead of independently, execute the processing such as zoom-in, zoom-out, rotation and scrolling to change the drawing image of the content.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-057171, filed Mar. 19, 2013, which is hereby incorporated by reference herein in its entirety.

What is claimed is:

1. A display control device comprising:
a processor; and
a memory storing instructions which, when executed by the processor, cause the processor to function as:
a detection unit configured to detect an input position, which is input by a user, on content at least a partial area of which is displayed on a predetermined display screen;
an operation acquisition unit configured to acquire an operation instructing to change a display form of content, based on a change of an input position detected by the detection unit; and
a display control unit configured to change the display form of the content in the predetermined display screen according to the acquired operation,
wherein the display control unit is further configured to:
1) when the acquired operation instructs a change exceeding a threshold value for change set in the content, in an image representing the content changed to correspond to the threshold value for change, provide a plurality of control points which are two-dimensionally provided in a two-dimensional plane at equal spaces, and
2) in a state where, among the plurality of control points, a group of control points which correspond to edges of a portion displayed on the predetermined display screen of the content are fixed and in two-dimensional plane coordinates or three-dimensional space coordinates, each of which is defined to include a whole display area of the predetermined display screen, by moving each control point other than the group of control points such that the smaller a distance between a position of each other control point and the detected input position is, the larger a moving amount of each other control point is, generate an image in which, among the area of the content displayed on the predetermined display screen, a periphery of the input position is partially changed based on the change of the input position, and
wherein the operation acquisition unit is further configured to acquire a touch operation instructing scrolling, zooming in, zooming out, or rotation of the area of the content displayed on the predetermined display screen.

2. The display control device according to claim 1, wherein the acquired operation further includes an instruction to instruct a direction toward which the change of a representation form of the content is made,
wherein the instructions, when executed by the processor, further cause the processor to function as a change information generation unit configured to generate a changed mesh by partitioning an image at a threshold value, which represents the content changed at, into mesh at equal spaces and by moving each of mesh intersections, as the plurality of control points, in accordance with a distance from the input position, a difference and the direction toward which the change is made, and
wherein the display control unit is further configured to change a degree of the change to be applied to the periphery of the input position of the content in accordance with the difference by executing texture mapping of the image changed at the threshold value to the changed mesh.

3. The display control device according to claim 2, wherein the change information generation unit is configured to change a movement amount of each of the mesh intersections based on a distance from a predetermined point of the mesh.

4. The display control device according to claim 3, wherein the change information generation unit is configured to prevent, among the mesh intersections, an intersection which is located at a certain distance away from the input position from moving.

5. The display control device according to claim 4, wherein the change information generation unit is configured to move each of the mesh intersections in a three-dimensional direction.

6. The display control device according to claim 5, wherein the instructions, when executed by the processor, further cause the processor to function as:
an end operation detection unit configured to detect an end instruction to end the change based on at least one input position no longer being detected by the detection unit; and
an image restoring unit configured to update, when distorted content is displayed on the predetermined display screen at a time of detecting the end instruction, the image as displayed on the predetermined display screen to the image at the threshold value.

7. The display control device according to claim 1, wherein, when the acquired touch operation instructs a change exceeding the threshold value for change for the scrolling, zooming in, zooming out, or rotation, the display control unit is further configured to partially change a periphery of a touch position in the area of the content displayed on the predetermined display screen.

8. The display control device according to claim 1, wherein:
the acquired touch operation is a multi-touch operation, and
when the acquired multi-touch operation instructs a change exceeding the threshold value for change, the display control unit is further configured to partially change, in accordance with the change of a touch position, a periphery area of each of a plurality of touch positions related to the acquired multi-touch operation in the area of the content displayed on the display screen.

9. A display control device comprising:
a processor; and
a memory storing instructions which, when executed by the processor, cause the processor to function as:
a detection unit configured to detect an input position, which is input by a user, on content at least a partial area of which is displayed on a predetermined display screen:
an operation acquisition unit configured to acquire an operation instructing to change a display form of content, based on a change of an input position detected by the detection unit; and
a display control unit configured to change the display form of the content in the predetermined display screen according to the acquired operation,
wherein the display control unit is further configured to:
1) when the acquired operation instructs a change exceeding a threshold value for change set in the content, in an image representing the content changed to correspond to the threshold value for change, provide a plurality of control points which are two dimensionally provided in a two-dimensional plane at equal spaces, and
2) in a state where, among the plurality of control points, a group of control points which correspond to edges of a portion displayed on the predetermined display screen of the content are fixed and in two-dimensional plane coordinates or three-dimensional space coordinates, each of which is defined to include a whole display area of the predetermined display screen, by moving each control point other than the group of control points such that the smaller a distance between a position of each other control point and the detected input position is, the larger a moving amount of each other control point is, generate an image in which, among the area of the content displayed on the predetermined display screen, a periphery of the input position is partially changed based on the change of the input position, and
wherein the operation acquisition unit is further configured to acquire a zooming in operation or a zooming out operation of the content.

10. The display control device according to claim 1,
wherein the acquired operation includes an instruction representing a changing amount for changing the display form of the content, and
wherein the display control unit is further configured to change a degree of the change to be applied to the periphery of the input position of the content in accordance with a difference between the changing amount and the threshold value for change.

11. The display control device according to claim 1, wherein when the acquired zooming in operation instructs a zooming in operation beyond an amount corresponding to a maximum zoom-in ratio which is set as the threshold value for change, or when the acquired zooming out operation instructs a zooming out operation beyond an amount corresponding to a minimum zoom-out ratio which is set as the threshold value for change, the display control unit is further configured to partially change, in accordance with the change of the input position, a periphery of the input position in the area of the content displayed on the predetermined display screen.

12. A method, executed by a display control device, for displaying at least a partial area of content, a representation form of which is changeable by a user's operation, on a predetermined display screen, comprising:
detecting an input position, which is input by a user, on the partial area of the content displayed on the display screen;
acquiring an operation instructing to change a display form of the content, based on a change of the detected input position;
acquiring a touch operation instructing scrolling, zooming in, zooming out, or rotation of the area of the content displayed on the predetermined display screen; and
changing the display form of the content in the predetermined display screen according to the acquired operation,
wherein the changing the display form of the content includes:
when the acquired operation instructs a change exceeding a threshold value for change set in the content, in an image representing the content changed to correspond to the threshold value for change, providing a plurality of control points which are two-dimensionally provided in a two dimensional plane at equal spaces, and
in a state where, among the plurality of control points, a group of control points which correspond to edges of a portion displayed on the predetermined display screen of the content are fixed and in two-dimensional plane coordinates or three-dimensional space coordinates, each of which is defined to include a whole display area of the predetermined display screen, by moving each control point other than the group of control points such that the smaller a distance between a position of each other control point and the detected input position the larger a moving amount of each other control point, generating an image in which, among the area of the content displayed on the predetermined display screen, a periphery of the input position is partially changed based on the change of the input position.

13. A non-transitory computer readable medium containing computer-executable instructions for causing a computer, which comprises a processor, to execute a method comprising:
detecting an input position, which is input by a user, on content at least a partial area of which is displayed on a predetermined display screen;
acquiring an operation instructing to change a display form of content, based on a change of the detected input position;
acquiring a touch operation instructing scrolling, zooming in, zooming out, or rotation of the area of the content displayed on the predetermined display screen; and
changing the display form of the content in the predetermined display screen according to the acquired operation,
wherein the changing the display form of the content includes:

when the acquired operation instructs a change exceeding a threshold value for change set in the content, in an image representing the content changed to correspond to the threshold value for change, providing a plurality of control points which are two-dimensionally provided in a two dimensional plane at equal spaces, and in a state where, among the plurality of control points, a group of control points which correspond to edges of a portion displayed on the predetermined display screen of the content are fixed and in two-dimensional plane coordinates or three-dimensional space coordinates, each of which is defined to include a whole display area of the predetermined display screen, by moving each control point other than the group of control points such that the smaller a distance between a position of each other control point and the detected input position the larger a moving amount of each other control point, generating an image in which, among the area of the content displayed on the predetermined display screen, a periphery of the input position is partially changed based on the change of the input position.

14. A method, executed by a display control device, for displaying at least a partial area of content, a representation form of which is changeable by a user's operation, on a predetermined display screen, comprising:

detecting an input position, which is input by a user, on the partial area of the content displayed on the display screen;

acquiring an operation instructing to change a display form of the content, based on a change of the detected input position;

acquiring a zooming in operation or a zooming out operation of the content; and changing the display form of the content in the predetermined display screen according to the acquired operation, wherein the changing the display form of the content includes:

when the acquired operation instructs a change exceeding a threshold value for change set in the content, in an image representing the content changed to correspond to the threshold value for change, providing a plurality of control points which are two-dimensionally provided in a two-dimensional plane at equal spaces, and in a state where, among the plurality of control points, a group of control points which correspond to edges of a portion displayed on the predetermined display screen of the content are fixed and in two-dimensional plane coordinates or three-dimensional space coordinates, each of which is defined to include a whole display area of the predetermined display screen, by moving each control point other than the group of control points such that the smaller a distance between a position of each other control point and the detected input position the larger a moving amount of each other control point, generating an image in which, among the area of the content displayed on the predetermined display screen, a periphery of the input position is partially changed based on the change of the input position.

15. A non-transitory computer readable medium containing computer-executable instructions for causing a computer, which comprises a processor, to execute a method comprising:

detecting an input position, which is input by a user, on content at least a partial area of which is displayed on a predetermined display screen;

acquiring an operation instructing to change a display form of content, based on a change of the detected input position;

acquiring a zooming in operation or a zooming out operation of the content; and changing the display form of the content in the predetermined display screen according to the acquired operation, wherein the changing the display form of the content includes:

when the acquired operation instructs a change exceeding a threshold value for change set in the content, in an image representing the content changed to correspond to the threshold value for change, providing a plurality of control points which are two-dimensionally provided in a two-dimensional plane at equal spaces, and in a state where, among the plurality of control points, a group of control points which correspond to edges of a portion displayed on the predetermined display screen of the content are fixed and in two-dimensional plane coordinates or three-dimensional space coordinates, each of which is defined to include a whole display area of the predetermined display screen, by moving each control point other than the group of control points such that the smaller a distance between a position of each other control point and the detected input position the larger a moving amount of each other control point, generating an image in which, among the area of the content displayed on the predetermined display screen, a periphery of the input position is partially changed based on the change of the input position.

* * * * *